United States Patent
Tijerina et al.

(10) Patent No.: US 10,936,978 B2
(45) Date of Patent: Mar. 2, 2021

(54) MODELS FOR VISUALIZING RESOURCE ALLOCATION

(71) Applicant: Apptio, Inc., Bellevue, WA (US)

(72) Inventors: David Tijerina, Shoreline, WA (US); Venkatesh Krishnan, Sammamish, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 15/271,013

(22) Filed: Sep. 20, 2016

(65) Prior Publication Data
US 2018/0082231 A1    Mar. 22, 2018

(51) Int. Cl.
*G06Q 10/06*    (2012.01)

(52) U.S. Cl.
CPC ..... *G06Q 10/06313* (2013.01); *G06Q 10/067* (2013.01); *G06Q 10/0637* (2013.01)

(58) Field of Classification Search
None
See application file for complete search history.

(56) References Cited

U.S. PATENT DOCUMENTS

| | | | |
|---|---|---|---|
| 4,744,026 A | 5/1988 | Vanderbei | |
| 5,249,120 A * | 9/1993 | Foley | G06Q 10/06 705/1.1 |
| 5,615,121 A | 3/1997 | Babayev et al. | |
| 5,619,211 A * | 4/1997 | Horkin | H04B 7/18508 342/352 |
| 5,721,919 A * | 2/1998 | Morel | G06F 16/289 |
| 5,758,327 A | 5/1998 | Gardner et al. | |
| 5,799,286 A * | 8/1998 | Morgan | G06Q 10/0631 705/30 |
| 5,802,508 A | 9/1998 | Morgenstern | |
| 5,903,453 A | 5/1999 | Stoddard, II | |
| 5,970,476 A * | 10/1999 | Fahey | G06Q 10/04 705/28 |

(Continued)

FOREIGN PATENT DOCUMENTS

JP    2011134268 A    7/2011

OTHER PUBLICATIONS

"Daytime vs Night display on Garmin GPS, POI Factory, Jun. 2008", http://www.poi-factory.com/node/14562.*

(Continued)

*Primary Examiner* — Octavian Rotaru
(74) *Attorney, Agent, or Firm* — John W. Branch; Branch Partners PLLC

(57) ABSTRACT

Embodiments are directed towards for models for visualizing resource allocation. A plurality of data models may be provided to a benchmarking engine. The benchmarking engine may be employed to provide a plurality of benchmark models based on the plurality of data models. If an organization is selected, additional actions may be performed including: providing one or more of the plurality of benchmark models based on a data model that corresponds to the organization and one or more model objects of the data model; and, employing a visualization engine to provide a visualization that compares one or more resource allocations associated with the one or more model objects with the one or more benchmark models, such that the visualization is displayed on a hardware display for viewing by a user.

28 Claims, 12 Drawing Sheets

(56) References Cited

U.S. PATENT DOCUMENTS

| | | | |
|---|---|---|---|
| 5,991,741 A * | 11/1999 | Speakman | G06Q 40/12 705/30 |
| 6,014,640 A * | 1/2000 | Bent | G06Q 40/02 705/30 |
| 6,032,123 A * | 2/2000 | Jameson | G06Q 10/04 705/7.22 |
| 6,047,290 A | 4/2000 | Kennedy et al. | |
| 6,208,993 B1 * | 3/2001 | Shadmon | G06F 16/30 |
| 6,249,769 B1 | 6/2001 | Ruffin et al. | |
| 6,253,192 B1 | 6/2001 | Corlett et al. | |
| 6,308,166 B1 * | 10/2001 | Breuker | G06Q 30/0283 704/8 |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 * | 1/2003 | Suh | G06Q 40/02 705/30 |
| 6,578,005 B1 * | 6/2003 | Lesaint | G06Q 10/06 705/7.14 |
| 6,594,672 B1 | 7/2003 | Lampson et al. | |
| 6,647,370 B1 * | 11/2003 | Fu | G06F 15/0266 705/7.19 |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 * | 1/2005 | Wallace | G06F 16/283 707/797 |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 * | 1/2006 | Trinon | G06Q 10/06 709/224 |
| 7,050,997 B1 | 5/2006 | Wood, Jr. | |
| 7,130,822 B1 | 10/2006 | Their et al. | |
| 7,149,700 B1 * | 12/2006 | Munoz | G06Q 10/06 705/7.27 |
| 7,177,850 B2 | 2/2007 | Argenton et al. | |
| 7,263,527 B1 | 8/2007 | Malcolm | |
| 7,305,491 B2 * | 12/2007 | Miller | G06Q 10/109 368/185 |
| 7,308,427 B1 | 12/2007 | Hood | |
| 7,321,869 B1 | 1/2008 | Phibbs, Jr. | |
| 7,386,535 B1 * | 6/2008 | Kalucha | G06Q 10/06 |
| 7,418,438 B2 | 8/2008 | Gould et al. | |
| 7,505,888 B2 | 3/2009 | Legault et al. | |
| 7,590,937 B2 | 9/2009 | Jacobus et al. | |
| 7,634,431 B2 * | 12/2009 | Stratton | G06Q 10/00 705/28 |
| 7,653,449 B2 * | 1/2010 | Hunter | G06Q 10/00 700/99 |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 * | 6/2010 | Aaron | G06Q 40/02 705/35 |
| 7,752,077 B2 | 7/2010 | Holden et al. | |
| 7,769,654 B1 * | 8/2010 | Hurewitz | G06Q 40/06 705/35 |
| 7,774,458 B2 * | 8/2010 | Trinon | G06Q 10/063 709/224 |
| 7,783,759 B2 * | 8/2010 | Eilam | H04L 67/1012 709/226 |
| 7,801,755 B2 | 9/2010 | Doherty et al. | |
| 7,805,400 B2 | 9/2010 | Teh et al. | |
| 7,813,948 B2 | 10/2010 | Ratzoff | |
| 7,852,711 B1 * | 12/2010 | Fitzgerald | G04R 20/16 368/21 |
| 7,870,051 B1 * | 1/2011 | En | G06Q 40/04 705/36 R |
| 7,877,742 B2 | 1/2011 | Duale et al. | |
| 7,899,235 B1 | 3/2011 | Williams et al. | |
| 7,917,555 B1 | 3/2011 | Gottumukkala et al. | |
| 7,930,396 B2 * | 4/2011 | Trinon | H04L 41/5054 709/224 |
| 7,933,861 B2 * | 4/2011 | Zadorozhny | G06F 16/2465 707/600 |
| 7,945,489 B2 | 5/2011 | Weiss et al. | |
| 7,966,235 B1 | 6/2011 | Capelli et al. | |
| 8,010,584 B1 | 8/2011 | Craver et al. | |
| 8,024,241 B2 * | 9/2011 | Bailey | G06Q 30/0206 705/35 |
| 8,073,724 B2 | 12/2011 | Harthcryde et al. | |
| 8,175,863 B1 * | 5/2012 | Ostermeyer | G06F 11/3409 703/22 |
| 8,195,524 B2 * | 6/2012 | Sandholm | G06Q 30/08 705/26.3 |
| 8,200,518 B2 | 6/2012 | Bailey et al. | |
| 8,200,561 B1 * | 6/2012 | Scott | G06Q 40/06 705/36 T |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,396,775 B1 * | 3/2013 | Mindlin | G06Q 40/04 705/36 R |
| 8,423,428 B2 * | 4/2013 | Grendel | G06Q 30/0635 705/26.81 |
| 8,484,355 B1 * | 7/2013 | Lochhead | G06F 9/5072 709/226 |
| 8,533,904 B2 * | 9/2013 | Conrad | A47L 11/4094 15/387 |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,655,714 B2 * | 2/2014 | Weir | G06Q 10/109 705/7.18 |
| 8,667,385 B1 | 3/2014 | Mui et al. | |
| 8,766,981 B2 * | 7/2014 | McLachlan | G06Q 10/06313 345/440 |
| 8,768,976 B2 * | 7/2014 | McLachlan | G06N 5/04 707/805 |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 * | 3/2015 | Chan | G06F 3/0484 345/156 |
| 8,996,552 B2 | 3/2015 | Munkes et al. | |
| 9,015,692 B1 | 4/2015 | Clavel | |
| 9,020,830 B2 * | 4/2015 | Purpus | G06Q 10/06 705/7.12 |
| 9,104,661 B1 | 8/2015 | Evans | |
| 9,213,573 B2 | 12/2015 | French et al. | |
| 9,268,964 B1 | 2/2016 | Schepis et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1 | 10/2017 | Mohler | |
| 10,152,722 B2 | 12/2018 | Heath | |
| 2002/0002557 A1 * | 1/2002 | Straube | G06F 16/27 |
| 2002/0016752 A1 * | 2/2002 | Suh | G06Q 40/02 705/30 |
| 2002/0056004 A1 | 5/2002 | Smith | |
| 2002/0069102 A1 | 6/2002 | Vellante et al. | |
| 2002/0082966 A1 * | 6/2002 | O'Brien | G06Q 10/10 705/36 R |
| 2002/0087441 A1 | 7/2002 | Wagner, Jr. et al. | |
| 2002/0107914 A1 | 8/2002 | Charisius et al. | |
| 2002/0123945 A1 * | 9/2002 | Booth | G06Q 10/06 705/30 |
| 2002/0129342 A1 | 9/2002 | Kil et al. | |
| 2002/0145040 A1 * | 10/2002 | Grabski, III | G06Q 40/02 235/385 |
| 2002/0154173 A1 | 10/2002 | Etgen et al. | |
| 2002/0156710 A1 | 10/2002 | Ryder | |
| 2002/0174006 A1 | 11/2002 | Rugge et al. | |
| 2002/0178198 A1 | 11/2002 | Steele | |
| 2002/0194329 A1 | 12/2002 | Alling | |
| 2003/0019350 A1 * | 1/2003 | Khosla | F41H 11/02 89/1.11 |
| 2003/0074269 A1 | 4/2003 | Viswanath | |

(56) References Cited

U.S. PATENT DOCUMENTS

| | | | |
|---|---|---|---|
| 2003/0083388 A1* | 5/2003 | L'Alloret | C08L 101/14 516/10 |
| 2003/0083888 A1* | 5/2003 | Argenton | G06Q 40/02 705/400 |
| 2003/0083912 A1 | 5/2003 | Covington et al. | |
| 2003/0093310 A1 | 5/2003 | Macrae | |
| 2003/0110113 A1* | 6/2003 | Martin | G06Q 40/04 705/36 R |
| 2003/0139960 A1* | 7/2003 | Nishikawa | G06Q 40/12 705/30 |
| 2003/0139986 A1 | 7/2003 | Roberts, Jr. | |
| 2003/0158724 A1* | 8/2003 | Uchida | G06Q 10/107 704/7 |
| 2003/0158766 A1 | 8/2003 | Mital et al. | |
| 2003/0172018 A1* | 9/2003 | Chen | G06Q 40/02 705/36 R |
| 2003/0172368 A1* | 9/2003 | Alumbaugh | G06F 8/71 717/106 |
| 2003/0195780 A1 | 10/2003 | Arora et al. | |
| 2003/0208493 A1 | 11/2003 | Hall et al. | |
| 2003/0217033 A1 | 11/2003 | Sandler et al. | |
| 2003/0233301 A1* | 12/2003 | Chen | G06Q 40/06 705/36 R |
| 2003/0236721 A1* | 12/2003 | Plumer | G06Q 10/06 705/30 |
| 2004/0030628 A1* | 2/2004 | Takamoto | G06Q 40/06 705/36 R |
| 2004/0039685 A1* | 2/2004 | Hambrecht | G06Q 40/04 705/37 |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1* | 5/2004 | Berger | G06F 16/25 |
| 2004/0111509 A1* | 6/2004 | Eilam | H04L 67/1029 709/224 |
| 2004/0133676 A1 | 7/2004 | Sproule | |
| 2004/0138942 A1 | 7/2004 | Pearson et al. | |
| 2004/0186762 A1* | 9/2004 | Beaven | G06Q 40/04 705/7.27 |
| 2004/0243438 A1 | 12/2004 | Mintz | |
| 2004/0249737 A1* | 12/2004 | Tofte | G06Q 40/06 705/35 |
| 2005/0004856 A1 | 1/2005 | Brose et al. | |
| 2005/0033631 A1* | 2/2005 | Wefers | G06Q 30/0201 705/7.29 |
| 2005/0037326 A1 | 2/2005 | Kuntz et al. | |
| 2005/0038788 A1 | 2/2005 | Dettinger et al. | |
| 2005/0044224 A1 | 2/2005 | Jun et al. | |
| 2005/0060298 A1 | 3/2005 | Agapi et al. | |
| 2005/0060317 A1* | 3/2005 | Lott | G06Q 10/00 |
| 2005/0071285 A1 | 3/2005 | Laicher et al. | |
| 2005/0091102 A1 | 4/2005 | Retsina | |
| 2005/0120032 A1* | 6/2005 | Liebich | G06Q 10/04 |
| 2005/0144110 A1* | 6/2005 | Chen | G06Q 40/00 705/36 T |
| 2005/0171918 A1 | 8/2005 | Eden et al. | |
| 2005/0235020 A1* | 10/2005 | Gabelmann | G06Q 10/087 |
| 2005/0246482 A1* | 11/2005 | Gabelmann | G06Q 30/0635 711/111 |
| 2006/0010156 A1 | 1/2006 | Netz et al. | |
| 2006/0010294 A1 | 1/2006 | Pasumansky et al. | |
| 2006/0041458 A1 | 2/2006 | Ringrose et al. | |
| 2006/0041501 A1* | 2/2006 | Tabata | G06Q 40/04 705/37 |
| 2006/0059032 A1 | 3/2006 | Wong et al. | |
| 2006/0074980 A1 | 4/2006 | Sarkar | |
| 2006/0080264 A1* | 4/2006 | Zhang | G06Q 30/02 705/400 |
| 2006/0085302 A1 | 4/2006 | Weiss et al. | |
| 2006/0085465 A1* | 4/2006 | Nori | G06F 16/213 |
| 2006/0106658 A1* | 5/2006 | Johanson | G06Q 10/06 705/7.37 |
| 2006/0116859 A1 | 6/2006 | Legault et al. | |
| 2006/0116975 A1 | 6/2006 | Gould et al. | |
| 2006/0126552 A1 | 6/2006 | Lee et al. | |
| 2006/0136281 A1* | 6/2006 | Peters | G06Q 30/0201 705/7.28 |
| 2006/0143219 A1 | 6/2006 | Smith et al. | |
| 2006/0161879 A1* | 7/2006 | Lubrecht | G06Q 10/06 717/101 |
| 2006/0167703 A1* | 7/2006 | Yakov | H05K 3/3421 705/26.1 |
| 2006/0178960 A1* | 8/2006 | Lepman | G06Q 40/025 705/30 |
| 2006/0179012 A1* | 8/2006 | Jacobs | G06Q 50/06 705/400 |
| 2006/0190497 A1* | 8/2006 | Inturi | G06F 16/213 |
| 2006/0200400 A1* | 9/2006 | Hunter | G06Q 10/06312 705/36 R |
| 2006/0200477 A1* | 9/2006 | Barrenechea | G06F 16/284 |
| 2006/0212146 A1 | 9/2006 | Johnson et al. | |
| 2006/0212334 A1* | 9/2006 | Jackson | G06F 9/5061 709/226 |
| 2006/0224740 A1* | 10/2006 | Sievers-Tostes | G06F 9/5038 709/226 |
| 2006/0224946 A1* | 10/2006 | Barrett | G06F 40/18 715/210 |
| 2006/0228654 A1* | 10/2006 | Sanjar | G06F 8/34 430/438 |
| 2006/0235785 A1* | 10/2006 | Chait | G06Q 40/06 705/37 |
| 2006/0277074 A1 | 12/2006 | Einav et al. | |
| 2006/0282429 A1* | 12/2006 | Hernandez-Sherrington | G06F 16/288 |
| 2007/0038494 A1 | 2/2007 | Kreitzbert et al. | |
| 2007/0088641 A1 | 4/2007 | Aaron et al. | |
| 2007/0113289 A1* | 5/2007 | Blumenau | G06F 16/125 726/26 |
| 2007/0118516 A1* | 5/2007 | Li | G06F 16/24528 |
| 2007/0124162 A1* | 5/2007 | Mekyska | G06Q 10/06 705/30 |
| 2007/0129892 A1* | 6/2007 | Smartt | G01C 21/3844 702/5 |
| 2007/0179975 A1 | 8/2007 | Teh et al. | |
| 2007/0185785 A1 | 8/2007 | Carlson et al. | |
| 2007/0198317 A1 | 8/2007 | Harthcryde et al. | |
| 2007/0198390 A1 | 8/2007 | Lazear et al. | |
| 2007/0198982 A1* | 8/2007 | Bolan | G06F 9/5038 718/104 |
| 2007/0214413 A1* | 9/2007 | Boeckenhauer | G06F 9/5027 715/700 |
| 2007/0226090 A1* | 9/2007 | Stratton | G06Q 10/087 705/30 |
| 2007/0260532 A1 | 11/2007 | Blake, III | |
| 2007/0271203 A1 | 11/2007 | Delvat | |
| 2007/0276755 A1* | 11/2007 | Rapp | G06Q 10/10 705/50 |
| 2007/0282626 A1* | 12/2007 | Zhang | G06Q 30/02 705/400 |
| 2008/0027957 A1 | 1/2008 | Bruckner et al. | |
| 2008/0033774 A1* | 2/2008 | Kimbrel | H04L 67/1002 705/7.25 |
| 2008/0059945 A1 | 3/2008 | Sauer et al. | |
| 2008/0060058 A1 | 3/2008 | Shea et al. | |
| 2008/0065435 A1* | 3/2008 | Ratzloff | G06Q 10/00 705/7.37 |
| 2008/0071844 A1 | 3/2008 | Gopal et al. | |
| 2008/0082186 A1 | 4/2008 | Hood et al. | |
| 2008/0082435 A1* | 4/2008 | O'Brien | G06Q 40/00 705/35 |
| 2008/0120122 A1 | 5/2008 | Olenski et al. | |
| 2008/0201269 A1* | 8/2008 | Hollins | G06Q 40/00 705/36 R |
| 2008/0201297 A1 | 8/2008 | Choi et al. | |
| 2008/0208647 A1* | 8/2008 | Hawley | G06Q 10/06393 705/7.39 |
| 2008/0208667 A1 | 8/2008 | Lymbery et al. | |
| 2008/0221949 A1 | 9/2008 | Delurgio et al. | |
| 2008/0222638 A1* | 9/2008 | Beaty | G06F 9/45558 718/100 |

(56) References Cited

U.S. PATENT DOCUMENTS

| | | | |
|---|---|---|---|
| 2008/0239393 A1 | 10/2008 | Navon | |
| 2008/0255912 A1 | 10/2008 | Christiansen et al. | |
| 2008/0295096 A1* | 11/2008 | Beaty | G06F 9/5077 718/1 |
| 2008/0312979 A1 | 12/2008 | Lee et al. | |
| 2008/0319811 A1 | 12/2008 | Casey | |
| 2009/0012986 A1* | 1/2009 | Arazi | G06F 16/2423 |
| 2009/0013325 A1 | 1/2009 | Kobayashi et al. | |
| 2009/0018880 A1* | 1/2009 | Bailey | G06Q 10/06 705/7.37 |
| 2009/0018996 A1 | 1/2009 | Hunt et al. | |
| 2009/0063251 A1* | 3/2009 | Rangarajan | G06Q 30/02 705/7.31 |
| 2009/0063540 A1 | 3/2009 | Mattox et al. | |
| 2009/0100017 A1 | 4/2009 | Graves et al. | |
| 2009/0100406 A1* | 4/2009 | Greenfield | G06F 8/10 717/104 |
| 2009/0144120 A1 | 6/2009 | Ramachandran | |
| 2009/0150396 A1* | 6/2009 | Elisha | G06F 16/211 |
| 2009/0195350 A1* | 8/2009 | Tsern | G06F 1/1626 340/3.1 |
| 2009/0198535 A1 | 8/2009 | Brown et al. | |
| 2009/0199192 A1 | 8/2009 | Laithwaite et al. | |
| 2009/0216580 A1* | 8/2009 | Bailey | G06Q 30/0283 705/7.27 |
| 2009/0222742 A1 | 9/2009 | Pelton et al. | |
| 2009/0234892 A1 | 9/2009 | Anglin et al. | |
| 2009/0300173 A1* | 12/2009 | Bakman | H04L 41/147 709/224 |
| 2009/0307597 A1 | 12/2009 | Bakman | |
| 2009/0319316 A1 | 12/2009 | Westerfeld et al. | |
| 2010/0005014 A1* | 1/2010 | Castle | G06Q 40/12 705/30 |
| 2010/0005173 A1* | 1/2010 | Baskaran | G06F 9/5066 709/226 |
| 2010/0017344 A1* | 1/2010 | Hambrecht | G06Q 40/06 705/36 R |
| 2010/0042455 A1* | 2/2010 | Liu | G06Q 10/0631 705/7.12 |
| 2010/0049494 A1 | 3/2010 | Radibratovic et al. | |
| 2010/0082380 A1* | 4/2010 | Merrifield, Jr. | G06Q 10/063 705/348 |
| 2010/0094740 A1 | 4/2010 | Richter | |
| 2010/0125473 A1* | 5/2010 | Tung | H04L 41/5096 709/200 |
| 2010/0153282 A1* | 6/2010 | Graham | G06Q 10/10 705/310 |
| 2010/0161371 A1 | 6/2010 | Cantor et al. | |
| 2010/0169477 A1* | 7/2010 | Stienhans | G06F 9/5083 709/224 |
| 2010/0185557 A1* | 7/2010 | Hunter | G06Q 40/06 705/36 R |
| 2010/0198750 A1* | 8/2010 | Ron | G06Q 40/10 705/36 T |
| 2010/0211667 A1* | 8/2010 | O'Connell, Jr. | G06Q 10/06 709/223 |
| 2010/0250419 A1 | 9/2010 | Ariff et al. | |
| 2010/0250421 A1* | 9/2010 | Ariff | G06Q 40/00 705/35 |
| 2010/0250642 A1* | 9/2010 | Yellin | G06F 11/3409 709/201 |
| 2010/0293163 A1* | 11/2010 | McLachlan | G06N 5/04 707/736 |
| 2010/0299233 A1* | 11/2010 | Licardi | G06Q 30/0603 705/30 |
| 2010/0306382 A1* | 12/2010 | Cardosa | G06F 9/45541 709/226 |
| 2010/0323754 A1* | 12/2010 | Nakagawa | G01S 19/35 455/556.1 |
| 2010/0325506 A1* | 12/2010 | Cai | H04W 72/042 714/748 |
| 2010/0325606 A1* | 12/2010 | Sundararajan | G06F 8/10 717/105 |
| 2010/0332262 A1* | 12/2010 | Horvitz | G06Q 30/06 705/4 |
| 2010/0333109 A1 | 12/2010 | Milnor | |
| 2011/0016214 A1* | 1/2011 | Jackson | G06F 9/505 709/226 |
| 2011/0016448 A1* | 1/2011 | Bauder | G06F 8/34 717/104 |
| 2011/0022861 A1* | 1/2011 | Agneeswaran | G06F 9/5077 713/310 |
| 2011/0066472 A1* | 3/2011 | Scheider | G06Q 10/063 705/7.29 |
| 2011/0066628 A1 | 3/2011 | Jayaraman | |
| 2011/0072340 A1* | 3/2011 | Miller | G06F 40/18 715/220 |
| 2011/0106691 A1* | 5/2011 | Clark | G06Q 40/06 705/38 |
| 2011/0107254 A1 | 5/2011 | Moroze | |
| 2011/0167034 A1* | 7/2011 | Knight | G06F 16/22 707/602 |
| 2011/0196795 A1 | 8/2011 | Pointer | |
| 2011/0225277 A1* | 9/2011 | Freimuth | G06F 9/45558 709/223 |
| 2011/0238608 A1 | 9/2011 | Sathish | |
| 2011/0261049 A1 | 10/2011 | Cardno et al. | |
| 2011/0295766 A1* | 12/2011 | Tompkins | G06Q 40/06 705/36 R |
| 2011/0313947 A1* | 12/2011 | Grohovaz | G06Q 40/06 705/36 R |
| 2012/0016811 A1* | 1/2012 | Jones | G06Q 40/06 705/36 R |
| 2012/0023170 A1 | 1/2012 | Matignon et al. | |
| 2012/0066020 A1* | 3/2012 | Moon | G06Q 10/10 705/7.28 |
| 2012/0116990 A1* | 5/2012 | Huang | G06Q 40/06 705/36 R |
| 2012/0131591 A1* | 5/2012 | Moorthi | H04L 67/10 718/104 |
| 2012/0150736 A1 | 6/2012 | Dickerson et al. | |
| 2012/0185368 A1 | 7/2012 | Schloter et al. | |
| 2012/0232947 A1* | 9/2012 | McLachlan | G06Q 10/06 705/7.23 |
| 2012/0233217 A1* | 9/2012 | Purpus | G06Q 10/06 707/792 |
| 2012/0233547 A1* | 9/2012 | McLachlan | G06Q 10/06 715/733 |
| 2012/0239739 A1 | 9/2012 | Manglik et al. | |
| 2012/0246046 A1* | 9/2012 | Hirsch | G06Q 10/06 705/35 |
| 2012/0272234 A1 | 10/2012 | Kaiser et al. | |
| 2012/0330869 A1 | 12/2012 | Durham | |
| 2013/0014057 A1 | 1/2013 | Reinpoldt et al. | |
| 2013/0028537 A1* | 1/2013 | Miyake | H04N 1/409 382/275 |
| 2013/0041792 A1 | 2/2013 | King et al. | |
| 2013/0041819 A1 | 2/2013 | Khasho | |
| 2013/0060595 A1* | 3/2013 | Bailey | G06Q 10/087 705/7.24 |
| 2013/0066866 A1 | 3/2013 | Chan et al. | |
| 2013/0091456 A1 | 4/2013 | Sherman et al. | |
| 2013/0091465 A1 | 4/2013 | Kikin-Gil et al. | |
| 2013/0103654 A1* | 4/2013 | McLachlan | G06F 16/23 707/692 |
| 2013/0124454 A1 | 5/2013 | Bhide et al. | |
| 2013/0124459 A1 | 5/2013 | Iwase et al. | |
| 2013/0138470 A1 | 5/2013 | Goyal et al. | |
| 2013/0159926 A1 | 6/2013 | Vainer et al. | |
| 2013/0173159 A1* | 7/2013 | Trum | G01C 21/3626 701/533 |
| 2013/0179371 A1 | 7/2013 | Jain et al. | |
| 2013/0201193 A1* | 8/2013 | McLachlan | G06Q 10/06313 345/441 |
| 2013/0227584 A1 | 8/2013 | Greene et al. | |
| 2013/0268307 A1* | 10/2013 | Li | G06Q 40/02 705/7.12 |
| 2013/0282537 A1* | 10/2013 | Snider | G06Q 40/02 705/30 |
| 2013/0293551 A1 | 11/2013 | Erez et al. | |

(56) References Cited

U.S. PATENT DOCUMENTS

| | | | |
|---|---|---|---|
| 2013/0339274 A1* | 12/2013 | Willis | G06Q 40/123 705/36 R |
| 2013/0346390 A1 | 12/2013 | Jerzak et al. | |
| 2014/0006085 A1 | 1/2014 | McLachlan et al. | |
| 2014/0006222 A1 | 1/2014 | Hericks et al. | |
| 2014/0067632 A1 | 3/2014 | Curtis | |
| 2014/0075004 A1 | 3/2014 | Van Dusen et al. | |
| 2014/0089509 A1 | 3/2014 | Akolkar et al. | |
| 2014/0108295 A1 | 4/2014 | Renshaw | |
| 2014/0122374 A1 | 5/2014 | Hacigumus et al. | |
| 2014/0129583 A1 | 5/2014 | Munkes et al. | |
| 2014/0136295 A1 | 5/2014 | Wasser | |
| 2014/0143175 A1* | 5/2014 | Greenshields | G06Q 40/06 705/36 R |
| 2014/0172918 A1 | 6/2014 | Kornmann et al. | |
| 2014/0229212 A1 | 8/2014 | MacElheron et al. | |
| 2014/0244364 A1* | 8/2014 | Evers | G06Q 10/06393 705/7.39 |
| 2014/0252095 A1* | 9/2014 | Kikin | G06K 19/07773 235/492 |
| 2014/0257928 A1* | 9/2014 | Chen | G06Q 30/0202 705/7.31 |
| 2014/0278459 A1* | 9/2014 | Morris | G16H 40/20 705/2 |
| 2014/0279121 A1 | 9/2014 | George et al. | |
| 2014/0279201 A1 | 9/2014 | Iyoob et al. | |
| 2014/0279676 A1 | 9/2014 | Schafer et al. | |
| 2014/0288987 A1 | 9/2014 | Liu | |
| 2014/0337007 A1 | 11/2014 | Waibel et al. | |
| 2014/0351166 A1* | 11/2014 | Schlossberg | G06Q 40/06 705/36 R |
| 2014/0365503 A1 | 12/2014 | Franceschini et al. | |
| 2014/0365504 A1 | 12/2014 | Franceschini et al. | |
| 2015/0006552 A1 | 1/2015 | Lord | |
| 2015/0012328 A1* | 1/2015 | McLachlan | G06Q 10/06315 705/7.25 |
| 2015/0046363 A1 | 2/2015 | McNamara et al. | |
| 2015/0066808 A1* | 3/2015 | Legare | G06Q 40/06 705/36 R |
| 2015/0074075 A1 | 3/2015 | Alexander | |
| 2015/0088584 A1 | 3/2015 | Santiago, III et al. | |
| 2015/0120370 A1 | 4/2015 | Agrawal et al. | |
| 2015/0149257 A1 | 5/2015 | Bielat et al. | |
| 2015/0278024 A1 | 10/2015 | Barman et al. | |
| 2015/0294273 A1* | 10/2015 | Barraci | G06Q 10/1093 705/7.18 |
| 2015/0302303 A1 | 10/2015 | Hakim | |
| 2015/0341230 A1 | 11/2015 | Dave et al. | |
| 2016/0098234 A1 | 4/2016 | Weaver et al. | |
| 2016/0266594 A1 | 9/2016 | Kauffman et al. | |
| 2017/0091689 A1 | 3/2017 | Elliott | |
| 2017/0102246 A1* | 4/2017 | Yang | G01C 21/3673 |
| 2017/0154088 A1 | 6/2017 | Sherman | |
| 2018/0068246 A1 | 3/2018 | Crivat et al. | |

OTHER PUBLICATIONS

Daytime vs Night display on Garmin GPS, POI Factory, Jun. 2008 http://www.poi-factory.com/node/14562 (Year: 2008).*

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#. Ukm5XsX7Lco.

"Automating Cost Transparency," Apptio, 2008, 15 pages http://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official journal EPO, Nov. 2007, pp. 592-593.

"Program Evaluation and Review Technique," Wkipedia, the free encyclopedia, accessed Mar. 13, 2012, 10 pages http://en.wikipedia.org/wiki/Program_Evaluation_and_Review_Technique—last modified Mar. 12, 2012.

"Project Management," Wkipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregisterco.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

International Search Report and Written Opinion for International Patent Application No. PCT/US2010/035021 dated Jul. 14, 2010, 12 pages.

International Preliminary Report on Patentability for International Patent Application No. PCT/US2010/035021 dated Nov. 24, 2011, 10 pages.

International Search Report and Written Opinion for International Patent Application No. PCT/US2012/028353 dated Oct. 31, 2012, 9 pages.

International Preliminary Report on Patentability for International Patent Application No. PCT/US2012/028353 dated Sep. 19, 2013, 6 pages.

International Search Report and Written Opinion for International Patent Application No. PCT/US2012/028378 dated Sep. 12, 2012, 11 pages.

International Preliminary Report on Patentability for International Patent Application No. PCT/US2012/028378 dated Sep. 19, 2013, 7 pages.

Extended European Search Report in EP Application No. 13151967.0-1955, dated Apr. 19, 2013, 8 pages.

Official Communication for U.S. Appl. No. 12/467,120 dated Oct. 4, 2011, 12 pages.

Official Communication for U.S. Appl. No. 12/467,120 dated Jun. 20, 2012, 17 pages.

Official Communication for U.S. Appl. No. 12/467,120 dated Aug. 29, 2012, 3 pages.

Official Communication for U.S. Appl. No. 12/467,120 dated Oct. 23, 2013, 21 pages.

Official Communication for U.S. Appl. No. 12/467,120 dated Mar. 26, 2013, 18 pages.

(56) References Cited

OTHER PUBLICATIONS

Official Communication for U.S. Appl. No. 13/324,253 dated Sep. 25, 2012, 17 pages.
Official Communication for U.S. Appl. No. 13/324,253 dated Jan. 10, 2013, 20 pages.
Official Communication for U.S. Appl. No. 13/324,253 dated Mar. 19, 2013, 3 pages.
Official Communication for U.S. Appl. No. 13/324,253 dated Sep. 6, 2013, 21 pages.
Official Communication for U.S. Appl. No. 13/415,797 dated Oct. 3, 2013, 17 pages.
Official Communication for U.S. Appl. No. 13/452,628 dated Apr. 22, 2013, 11 pages.
Official Communication for U.S. Appl. No. 13/675,837 dated Oct. 10, 2013, 41 pages.
Official Communication for U.S. Appl. No. 13/837,815 dated Oct. 23, 2013, 9 pages.
Official Communication for U.S. Appl. No. 13/917,478 dated Nov. 7, 2013, 15 pages.
Official Communication for U.S. Appl. No. 13/917,503 dated Oct. 10, 2013, 41 pages.
Official Communication for U.S. Appl. No. 13/935,147 dated Oct. 22, 2013, 16 pages.
Office Communication for U.S. Appl. No. 13/649,019 dated Sep. 23, 2015, 15 pages.
Office Communication for U.S. Appl. No. 13/365,150 dated Sep. 24, 2015, 15 pages.
Office Communication for U.S. Appl. No. 14/033,130 dated Sep. 15, 2015, 22 pages.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for Application No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Official Communication for U.S. Appl. No. 13/452,628 dated Nov. 18, 2013, 15 pages.
Official Communication for U.S. Appl. No. 14/033,130 dated Dec. 16, 2013, 15 pages.
Official Communication for U.S. Appl. No. 13/324,253 dated Jan. 23, 2014, 15 pages.
Official Communication for U.S. Appl. No. 13/675,837 dated Jan. 31, 2014, 37 pages.
Official Communication for U.S. Appl. No. 13/917,503 dated Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010 open_group building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.

Cost Optimisation with Amazon Web Services, extracted slides, Slideshare Jan. 30, 2012 http://www.sideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.
Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No. 14/033,130 dated May 27, 2014, 22 pages.
Office Communication for U.S. Appl. No. 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,306 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015, 14 pages.
European Search Report for Application No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.

(56) References Cited

OTHER PUBLICATIONS

Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No. 13/415,797 dated Oct. 19, 2015, 3 pages.
Official Communication for U.S. Appl. No. 13/837,815 dated Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Fiippo et al., "A Framework for Rapid Development of Multimodal Interfaces." Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Office Communication for U.S. Appl. No. 13/837,815 dated Jun. 23, 2016, 3 pages.
Office Communication for U.S. Appl. No. 14/033,130 dated Apr. 25, 2016, 4 pages.
Office Communication for U.S. Appl. No. 14/846,349 dated Jul. 1, 2016, 24 pages.
Office Communication for U.S. Appl. No. 14/869,721 dated Jun. 1, 2016, 35 pages.
Office Communication for U.S. Appl. No. 14/971,944 dated May 19, 2016, 17 pages.
Office Communication for U.S. Appl. No. 14/977,368 dated Jun. 7, 2016, 11 pages.
Office Communication for U.S. Appl. No. 14/981,747 dated Jul. 14, 2016, 29 pages.
Official Communication for U.S. Appl. No. 13/415,797 dated Jan. 11, 2017.
Official Communication for U.S. Appl. No. 13/675,837 dated Jan. 11, 2017.
Official Communication for U.S. Appl. No. 13/917,503 dated Jan. 12, 2017.
Official Communication for U.S. Appl. No. 14/033,130 dated Jan. 11, 2017.
Official Communication for U.S. Appl. No. 14/867,552 dated Jan. 9, 2017.
Official Communication for U.S. Appl. No. 15/351,313 dated Jan. 12, 2017.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communications for U.S. Appl. No. 15/379,267 dated Mar. 10, 2017, 11 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communications for European Application No. 13151967.0 dated Aug. 18, 2017.
European Search Report for Application No. 10775648.8 dated Mar. 10, 2017.
Official Communications for European Application No. 12755613.2 dated Aug. 17, 2017.
Official Communications for U.S. Appl. No. 14/033,130 dated Sep. 7, 2017.
Official Communications for U.S. Appl. No. 14/846,349 dated Sep. 8, 2017.
Official Communications for U.S. Appl. No. 13/452,628 dated Sep. 28, 2017.
Official Communications for U.S. Appl. No. 13/837,815 dated Sep. 28, 2017.
Official Communications for U.S. Appl. No. 13/415,797 dated Sep. 7, 2017.
Official Communications for U.S. Appl. No. 13/917,503 dated Nov. 28, 2017.
Official Communications for U.S. Appl. No. 13/935,147 dated Nov. 3, 2017.
Official Communications for U.S. Appl. No. 14/846,349 dated Nov. 20, 2017.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/935,147 dated Nov. 3, 2017, 11 pages.
Official Communication for U.S. Appl. No. 13/415,797 dated Apr. 14, 2017, 3 pages.

(56) References Cited

OTHER PUBLICATIONS

Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/180,308 dated May 25, 2017, 21 pages.
Official Communication for U.S. Appl. No. 14/981,747 dated May 19, 2017, 43 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 13/837,815 dated Jan. 26, 2018, 12 pages.
Official Communication for U.S. Appl. No. 14/869,721 dated Jan. 19, 2018, 3 pages.
Official Communication for U.S. Appl. No. 14/667,552 dated Feb. 13, 2018, 3 pages.
Official Communication for U.S. Appl. No. 15/859,008 dated Mar. 5, 2018, 20 pages.
Official Communication for U.S. Appl. No. 13/935,147 dated Jan. 17, 2018, 3 pages.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 14/867,552 dated May 31, 2018, pp. 1-22.
Official Communication for U.S. Appl. No. 14/180,308 dated Dec. 22, 2017, 18 pages.
Official Communication for U.S. Appl. No. 14/846,349 dated Jan. 18, 2018, 29 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 13/917,503 dated Nov. 20, 2018.
Official Communication for U.S. Appl. No. 13/917,147 dated Aug. 10, 2018.
Official Communication for U.S. Appl. No. 14/033,130 dated Aug. 9, 2018.
Official Communication for U.S. Appl. No. 14/180,308 dated Aug. 6, 2018.
Official Communication for U.S. Appl. No. 14/867,552 dated Nov. 21, 2018.
Official Communication for U.S. Appl. No. 14/869,721 dated Oct. 11, 2018.
Official Communication for U.S. Appl. No. 14/981,747 dated Jul. 5, 2018.
Official Communication for U.S. Appl. No. 15/260,221 dated Oct. 5, 2018.
Official Communication for U.S. Appl. No. 15/858,945 dated Aug. 10, 2018.
Official Communication for U.S. Appl. No. 15/858,008 dated Jul. 31, 2018.
Official Communication for U.S. Appl. No. 15/859,058 dated Dec. 5, 2018.
Official Communication for U.S. Appl. No. 15/379,267 dated Jul. 19, 2018.
Official Communication for U.S. Appl. No. 15/379,267 dated Oct. 18, 2018.
Official Communication for U.S. Appl. No. 13/917,503 dated Nov. 20, 2018, pp. 1-55.
Official Communication for U.S. Appl. No. 13/917,147 dated Aug. 10, 2018, pp. 1-25.
Official Communication for U.S. Appl. No. 14/033,130 dated Aug. 9, 2018, pp. 1-47.
Official Communication for U.S. Appl. No. 14/180,308 dated Aug. 6, 2018, pp. 1-23.
Official Communication for U.S. Appl. No. 14/867,552 dated Nov. 21, 2018, pp. 1-37.
Official Communication for U.S. Appl. No. 14/869,721 dated Oct. 11, 2018, pp. 1-73.
Official Communication for U.S. Appl. No. 14/981,747 dated Jul. 5, 2018, pp. 1-62.
Official Communication for U.S. Appl. No. 15/260,221 dated Oct. 5, 2018, pp. 1-40.
Official Communication for U.S. Appl. No. 15/858,945 dated Aug. 10, 2018, pp. 1-25.
Official Communication for U.S. Appl. No. 15/858,008 dated Jul. 31, 2018, pp. 1-28.
Official Communication for U.S. Appl. No. 15/859,058 dated Dec. 5, 2018, pp. 1-20.
Official Communication for U.S. Appl. No. 15/379,267 dated Jul. 19, 2018, pp. 1-34.
Official Communication for U.S. Appl. No. 15/379,267 dated Oct. 18, 2018, pp. 1-9.
Official Communication for U.S. Appl. No. 14/033,130 dated Dec. 18, 2018, pp. 1-11.

(56) References Cited

OTHER PUBLICATIONS

Official Communication for U.S. Appl. No. 14/981,747 dated Aug. 1, 2019, pp. 1-5.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Selen, et al. "Model-Order Selection: A review of information criterion rules," IEEE Signal Processing Magazine, Jul. 2004, pp. 38-47.
Official Communication for U.S. Appl. No. 13/935,147 dated Mar. 28, 2019, pp. 1-80.
Official Communication for U.S. Appl. No. 14/033,130 dated Apr. 10, 2019, pp. 1-80.
Official Communication for U.S. Appl. No. 14/180,308 dated Feb. 26, 2019, pp. 1-26.
Official Communication for U.S. Appl. No. 14/846,349 dated Apr. 11, 2019, pp. 1-57.
Official Communication for U.S. Appl. No. 14/867,552 dated Feb. 11, 2019, pp. 1-76.
Official Communication for U.S. Appl. No. 14/981,747 dated Dec. 26, 2018, pp. 1-63.
Official Communication for U.S. Appl. No. 15/260,221 dated Jan. 8, 2019, pp. 1-27.
Official Communication for U.S. Appl. No. 13/917,503 dated Apr. 1, 2019, pp. 1-38.
Official Communication for U.S. Appl. No. 15/351,313 dated Apr. 1, 2019, pp. 1-38.
Official Communication for U.S. Appl. No. 15/858,945 dated Feb. 26, 2019, pp. 1-13.
Official Communication for U.S. Appl. No. 15/859,058 dated Mar. 25, 2019, pp. 1-57.
Official Communication for U.S. Appl. No. 15/859,008 dated Apr. 12, 2019, pp. 1-24.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 14/981,747 dated May 8, 2019, pp. 1-77.
Official Communication for U.S. Appl. No. 13/935,147 dated Mar. 28, 2019.
Official Communication for U.S. Appl. No. 14/033,130 dated Apr. 10, 2019.
Official Communication for U.S. Appl. No. 14/180,308 dated Feb. 26, 2019.
Official Communication for U.S. Appl. No. 14/846,349 dated Apr. 11, 2019.
Official Communication for U.S. Appl. No. 14/867,552 dated Feb. 11, 2019.
Official Communication for U.S. Appl. No. 14/981,747 dated Dec. 26, 2018.
Official Communication for U.S. Appl. No. 15/260,221 dated Jan. 8, 2019.
Official Communication for U.S. Appl. No. 13/917,503 dated Apr. 1, 2019.
Official Communication for U.S. Appl. No. 15/351,313 dated Apr. 1, 2019.
Official Communication for U.S. Appl. No. 15/858,945 dated Feb. 26, 2019.
Official Communication for U.S. Appl. No. 15/859,058 dated Mar. 25, 2019.
Official Communication for U.S. Appl. No. 15/859,008 dated Apr. 12, 2019.
Official Communication for U.S. Appl. No. 14/869,721 dated Jun. 20, 2019.
Official Communication for U.S. Appl. No. 14/180,308 dated Jun. 11, 2019.
Official Communication for U.S. Appl. No. 15/260,221 dated Jul. 11, 2019.
Official Communication for U.S. Appl. No. 15/351,313 dated Jun. 14, 2019.
Official Communication for U.S. Appl. No. 14/981,747 dated May 8, 2019.
Official Communication for U.S. Appl. No. 13/917,503 dated Dec. 31, 2019, pp. 1-28.
Official Communication for U.S. Appl. No. 14/846,349 dated Jan. 21, 2020, pp. 1-6.
Official Communication for U.S. Appl. No. 15/659,008 dated Feb. 26, 2020, pp. 1-8.
Official Communication for U.S. Appl. No. 14/180,308 dated Mar. 9, 2020, pp. 1-5.
Official Communication for U.S. Appl. No. 14/846,349 dated Oct. 18, 2019.
Official Communication for U.S. Appl. No. 14/981,747 dated Oct. 24, 2019.
Official Communication for U.S. Appl. No. 15/859,008 dated Oct. 24, 2019.
Official Communication for U.S. Appl. No. 14/180,308 dated Dec. 10, 2019.
Official Communication for U.S. Appl. No. 13/917,503 dated Dec. 31, 2019.
Official Communication for U.S. Appl. No. 14/846,349 dated Jan. 21, 2020.
Official Communication for U.S. Appl. No. 15/859,008 dated Feb. 26, 2020.
Official Communication for U.S. Appl. No. 14/180,308 dated Mar. 9, 2020.
Official Communication for U.S. Appl. No. 14/646,349 dated Oct. 18, 2019, pp. 1-52.
Official Communication for U.S. Appl. No. 14/981,747 dated Oct. 24, 2019, pp. 1-62.
Official Communication for U.S. Appl. No. 15/859,008 dated Oct. 24, 2019, pp. 1-22.
Official Communication for U.S. Appl. No. 14/180,308 dated Dec. 10, 2019, pp. 1-29.
Office Communication for U.S. Appl. No. 13/917,503 dated May 7, 2020, pp. 1-25.
Office Communication for U.S. Appl. No. 14/180,308 dated May 11, 2020, pp. 1-18.
Office Communication for U.S. Appl. No. 15/859,008 dated May 28, 2020, pp. 1-20.
Office Communication for U.S. Appl. No. 14/846,349 dated Jun. 8, 2020, pp. 1-32.
Office Communication for U.S. Appl. No. 13/917,503 dated Jul. 29, 2020, pp. 1-6.
Examination Report for UK Patent Application No. GB1617238.9 dated Sep. 24, 2020, pp. 1-7,
Office Communication for U.S. Appl. No. 15/859,008 dated Oct. 9, 2020, pp. 1-22.
Office Communication for U.S. Appl. No. 14/180,308 dated Oct. 13, 2020, pp. 1-17.
Beraldi, et al., "A Clustering Approach for Scenario Tree Reduction: an Application to a Stochastic Programming Portfolio Optimization Problem," TOP, vol. 22, No. 3, 2014, pp. 934-949.
Official Communication for U.S. Appl. No. 14/981,747 dated Apr. 23, 2020, pp. 1-14.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.

\* cited by examiner

MODELS FOR VISUALIZING RESOURCE ALLOCATION

TECHNICAL FIELD

The present invention relates generally to computer automated activity based resource allocation modeling, and more particularly, but not exclusively to visualizations for resource allocation data models.

BACKGROUND

Businesses that strive to remain viable and successful in today's competitive commercial environment are required to adopt accurate and responsive resource allocation and resource budgeting practices. To improve efficiency, businesses may use models that apply modern budgeting, forecasting and resource accounting techniques. For some resource allocation techniques, the complexity of the underlying data models may increase as the number of tracked activities and elements increases. Therefore, for larger enterprises, sophisticated computer programs and computers are often required to assist in generating useful and relevant resource models for analyzing resource allocations. In some cases, the large number of items and entities required for enterprise scale resource modeling may make development of resource models difficult. In some cases the complexity of the models and the modelled items and entities may make it difficult to compare efficiencies across large enterprises and/or between different enterprises. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DETAILED DESCRIPTION OF THE VARIOUS EMBODIMENTS

Figure 1:
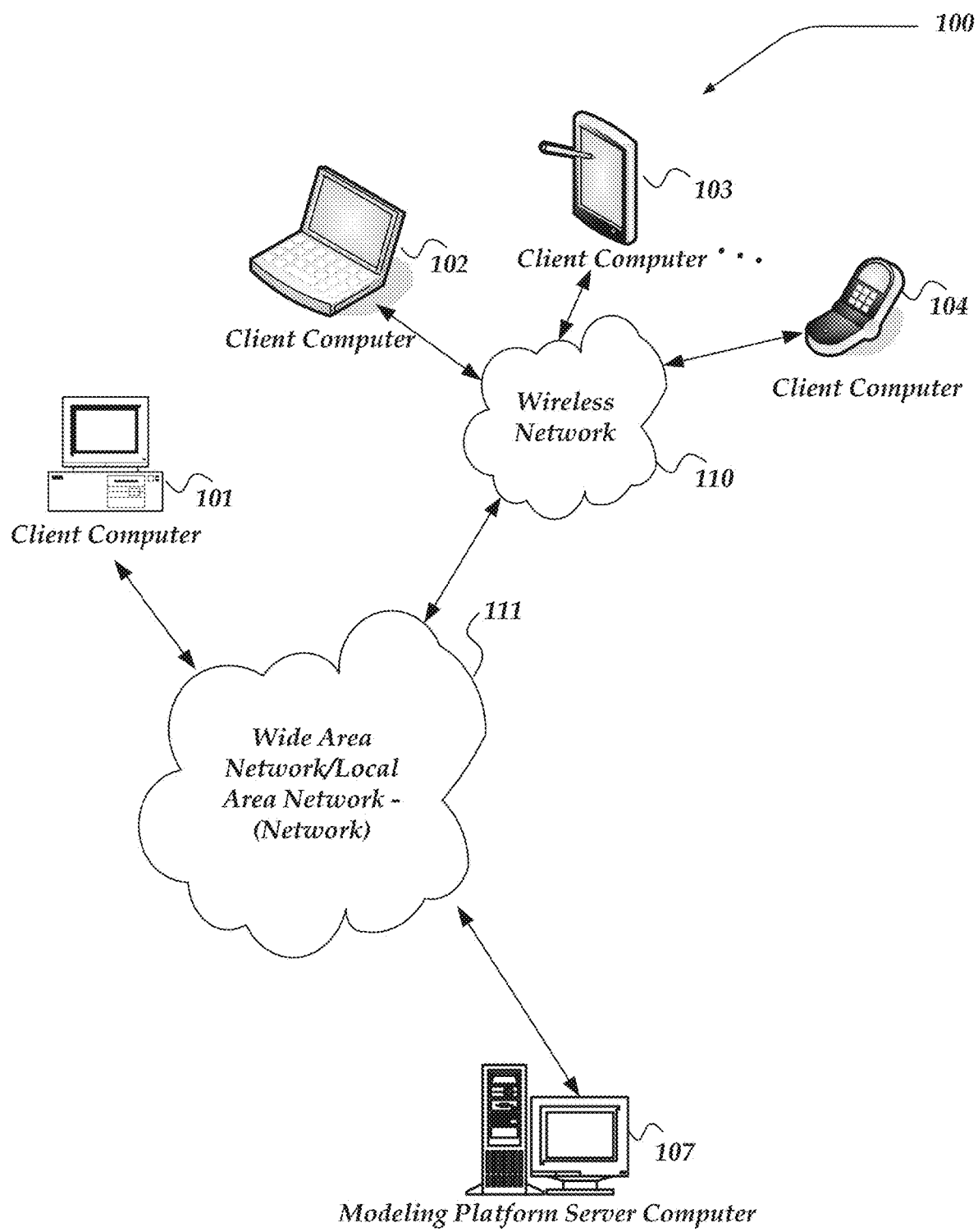
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources and/or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "data model," or "model object" refers to a set and/or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category and/or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. In some embodiments, datasets may be ingested to produce data model objects for data models. Non-tabular datasets can also take the form of marked up strings of characters, such as an XML, file.

As used herein, the term "source object" refers to a model object in a data model that may be providing resource values that may be allocated to one or more other model objects (target objects).

As used herein, the term "target object" refers to a model object in a data model that may be allocated resources from one or more other model objects (source objects).

As used herein, the term "benchmarking information" refers to values that are computers and/or generated from various sources, such as, community models, third-party/external information, industry surveys, or the like. Benchmarking information may be ratios, ranges, averages, means, median, min/max values, time-series, regressions, or the like, or combination thereof, related to values associated with one or more model elements. A benchmarking engine may be arranged to generate various types of benchmarking information depending on the benchmark types, model types, model compositions, configurations, user input, or the like, or combination thereof.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards for models for visualizing resource allocation. In at least one of the various embodiments, a plurality of data models may be provided to a benchmarking engine, such that the plurality of data models may each be comprised of two or more nodes and one or more edges from a memory that may be configured and arranged to store the plurality of data models, and such that each node may represent a model object and each edge may represent a resource allocation.

In at least one of the various embodiments, the benchmarking engine may be employed to provide a plurality of benchmark models based on the plurality of data models. In at least one of the various embodiments, providing the plurality of benchmark models, may include, providing one or more characteristics of the model objects that may be associated with the plurality of data models, such that the one or more characteristics may include one or more of, a median resource allocation value, an upper quartile resource allocation value, a lower quartile resource allocation value, a highest resource allocation value, a lowest resource allocation value, or the like.

In at least one of the various embodiments, if an organization is selected, addition actions may be performed including: providing one or more of the plurality of benchmark models based on a data model that corresponds to the organization and one or more model objects of the data model; and, in some embodiments, employing a visualization engine to provide a visualization that compares one or more resource allocations associated with the one or more model objects with the one or more benchmark models, such that the visualization is displayed on a hardware display for viewing by a user.

Accordingly, in at least one of the various embodiments, if one or more criteria of the one or more benchmark models may be selected, further actions may be performed, including: employing the benchmarking engine to provide one or more other benchmark models from the plurality of benchmark models based on the one or more selected criteria and the data model and the one or more model objects of the data model; and employing the visualization engine to provide a modified visualization based on the one or more other benchmark models, such that the modified visualization may be displayed on the hardware display. In at least one of the various embodiments, providing the one or more of the plurality of benchmark models, may include, providing the one or more of the plurality of benchmark models based on one or more of a plurality of criteria of their underlying organization, such that the one or more criteria may include one or more of revenue, geographic region, industry, size of operations, number of employees, or the like.

In at least one of the various embodiments, a resource modeling engine may be employed that traverses the data model corresponding to the organization to provide resource allocation information associated with the one or more model objects.

In at least one of the various embodiments, one or more external benchmark models that are associated with the organization may be provided. And, in some embodiments, the visualization engine may be employed to provide a modified visualization based on the one or more external benchmark models, such that the modified visualization may be displayed on the hardware display.

In at least one of the various embodiments, the plurality of data models may be modified based on changes to their resource allocations. And, in some embodiments, the benchmarking engine may be employed to modify the plurality of benchmark models based on the plurality of modified data models.

In at least one of the various embodiments, if one of the one or more benchmark models may be selected, the data model corresponding to the organization may be traversed to identify the one or more model objects that may be associated with the selected one or more benchmark models. And, in some embodiments, resource allocation information for the identified one or more model objects may be displayed on the hardware display.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")—(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including resource allocation information, report requests (e.g., queries) between another computing device. Client applications may include a capability to provide requests and/or receive data relating to the data models, reports, project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to data models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
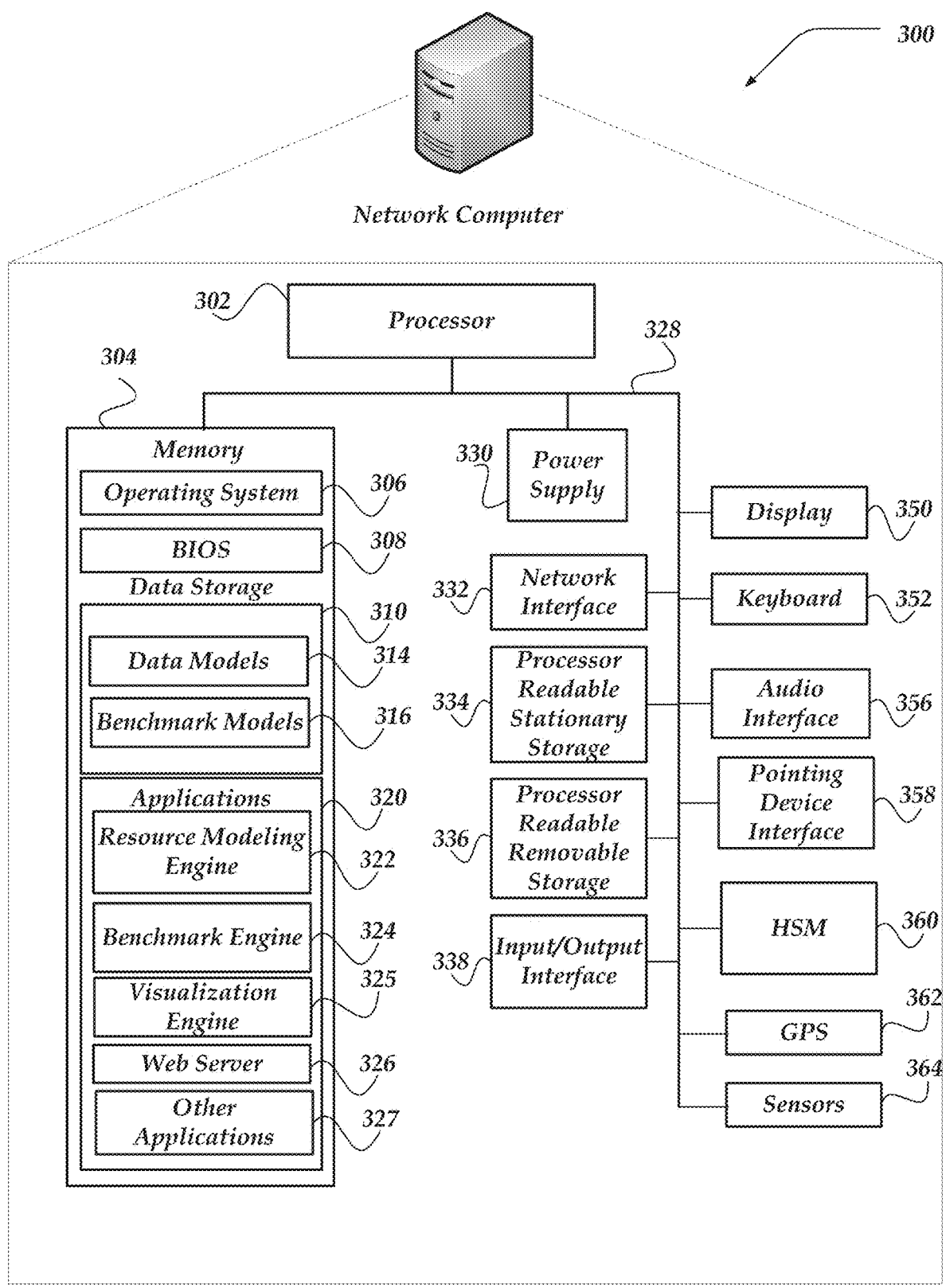
FIG. 3 illustrates one embodiment of a network computer that may be included in a system.

Modeling platform server computer 107 may include virtually any network computer usable to perform data processing operation that may be used for generating data models, allocation rules, recursive allocation rules, resource allocations, displays and/or reports thereof, such as network computer 300 of FIG. 3. In at least one of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, recursive allocation rules or the like. Furthermore, modeling platform server computer 107 may include and/or generate data processing applications for visualizing the generated resource allocations, data models, reciprocal models, allocation rules, recursive allocation rules, or the like.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in at least one of the various embodiments, modeling platform server computer 107 may be distributed over a plurality of network computers and/or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), and/or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client Computer

Figure 2:
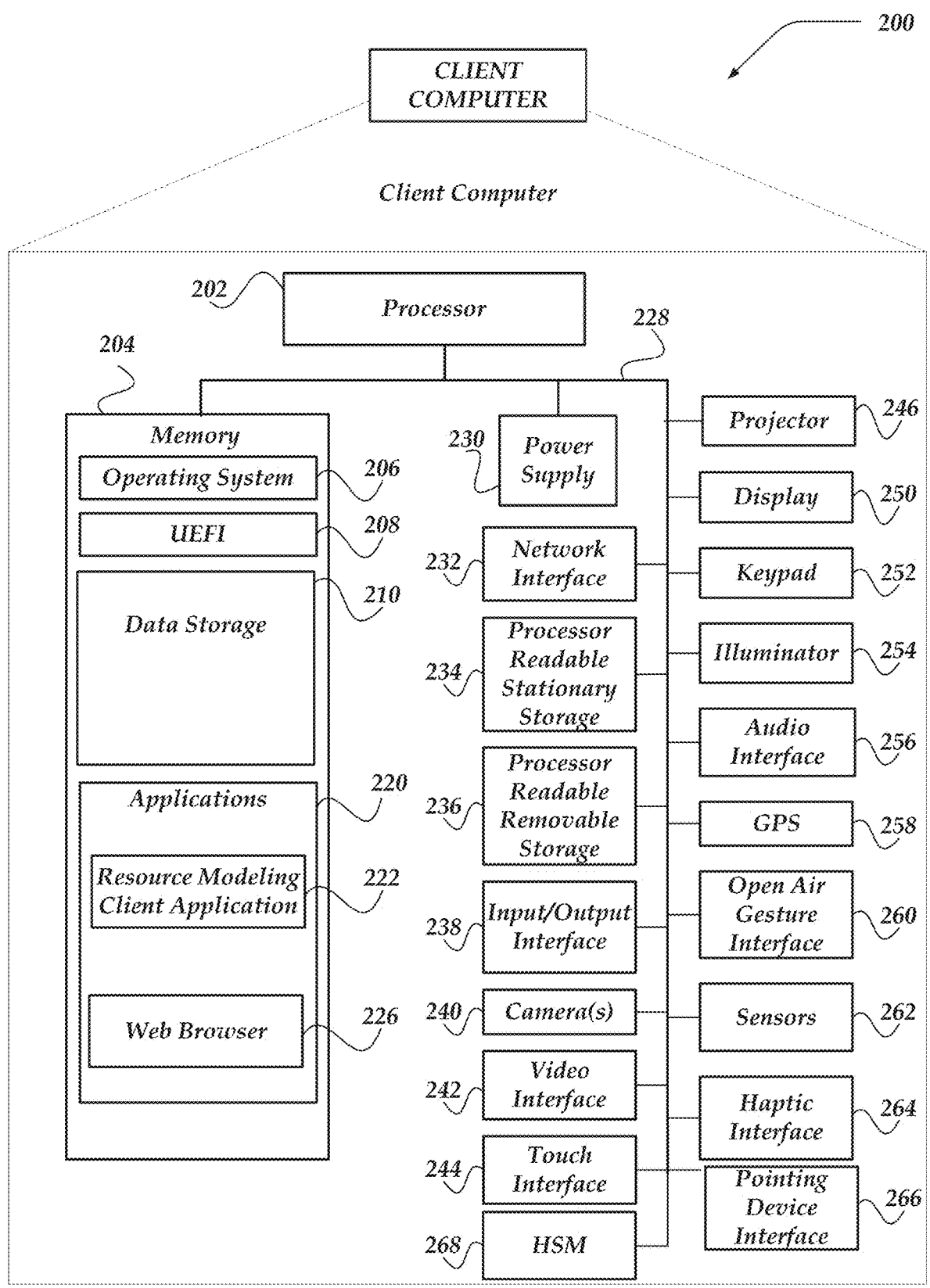
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, resource modeling client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, resource modeling client application 222. In at least one of the various embodiments, resource modeling client application 222 may be used to exchange communications to and from modeling platform server computer 107, including, but not limited to, queries, searches, API calls, configuration information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data model information 314, benchmark model information 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, benchmark modeling engine 324, visualization engine 325, web server application 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, resource modeling engine 322, benchmark modeling engine 324, visualization engine 325, web server application 326, other applications 327, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 111.

Furthermore, in at least one of the various embodiments, resource modeling engine 322, benchmark modeling engine 324, or visualization engine 325 may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to resource modeling engine 322, benchmark modeling engine 324, or visualization engine 325 may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

In at least one of the various embodiments, resource modeling engine 322, benchmark modeling engine 324, or visualization engine 325 may enable a user to generate project plans, allocation rules, data models, reports, what-if-analysis, or the like. Also in at least one of the various embodiments, resource modeling engine 322, benchmark modeling engine 324, or visualization engine 325 may employ processes, or parts of processes, similar to those described below.

Illustrative Logical System Architecture

FIGS. 4-8 are presented to illustrate logical architectures at least one of the various embodiments for models for visualizing resource allocation.

Figure 4:
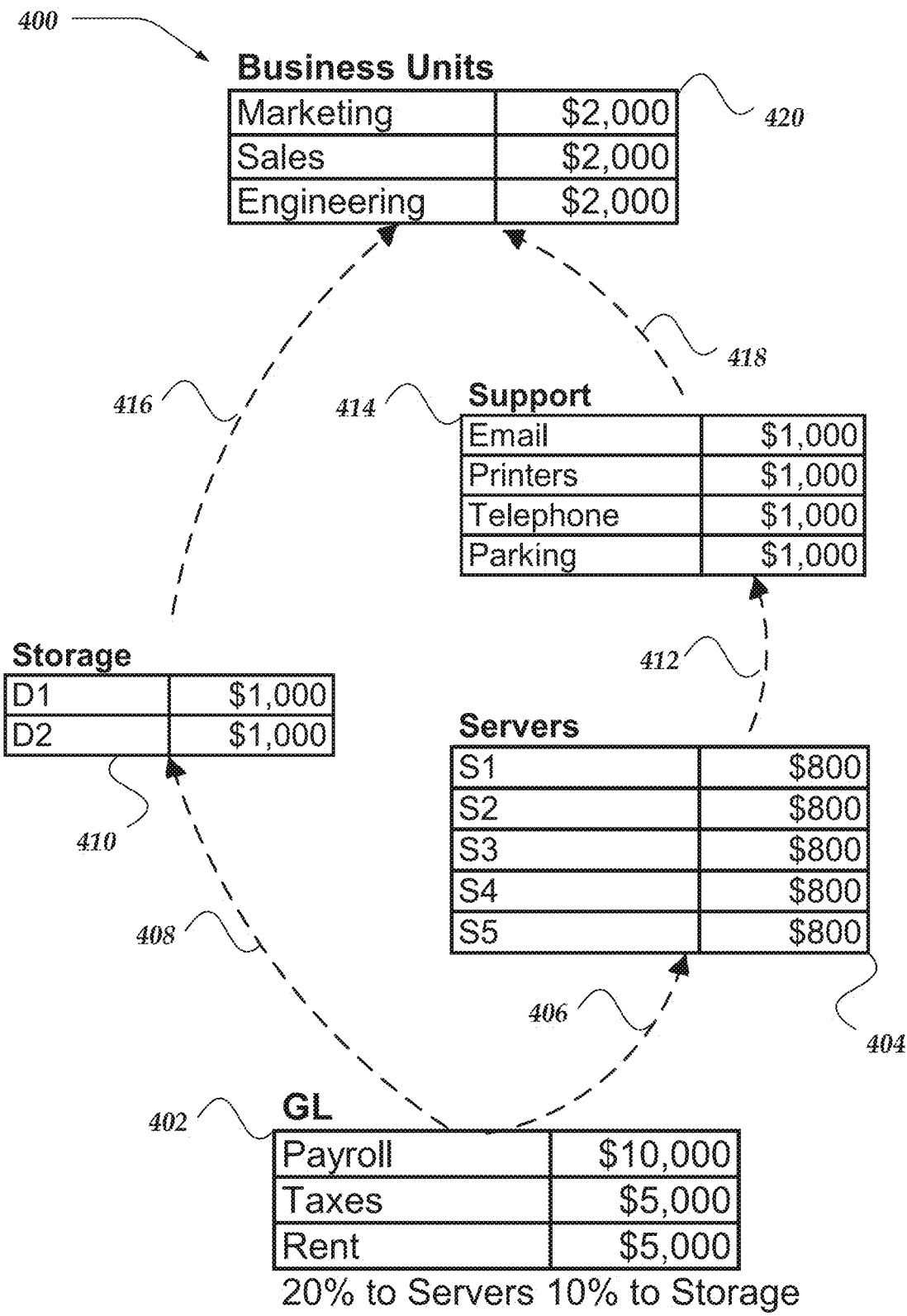
FIG. 4 illustrates a portion of a logical architecture for a data model that may be enabled by at least one of the various embodiments.

FIG. 4 illustrates a portion of a logical architecture for data model 400 that may be enabled by at least one of the various embodiments.

In at least one of the various embodiments, model 400 may have five objects: GL 402, Servers 404, Storage 410, Support 414, and Business Units 420. In at least one of the various embodiments, each object contains a set of resource cost line items. For example, GL 402 includes resource cost line items for Payroll, Taxes and Rent. Likewise, Support 414 includes resource cost line items Email, Printers, Telephone, and Parking. In at least one of the various embodiments, each resource cost line item has one or more associated resource values. For example, Storage 410 has two resource cost line items, D1, and D2 (e.g., disk drives) having associated resource cost values of $1000 each.

Allocation rules may be used to connect objects of data model 400. In at least one of the various embodiments, allocation rules may show how resources flow between the objects modeled by data model 400. Resulting in a graph where the objects may be represented as nodes and the allocation rules may be represented as edges. In at least one of the various embodiments, generally a data model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, data models may be arranged to be stored in self-referential database such that some or all of the data objects for a data model may be stored in the same table. Accordingly, different records in the table may be arranged to include references to other records in the same table that also represent data model objects for a data model. Accordingly, in some embodiments, the graph structure of a data model may be represented in a single table rather than require normalized databased tables. Accordingly, in some embodiments, the data models may be traversed by scanning through a single table rather than having to execute slower performing database query joins, or the like.

In at least one of the various embodiments, allocation rule 406 represents a rule allocating 20% of the resources of object GL 402 (source object) to Servers object 404 (target object). In this example, GL 402 includes resources values at $20,000, thus 20% of $20,000 (e.g., $4,000) flows based on allocation rule 406 to Servers 404. Likewise, allocation rule 408 may allocate $2,000 from GL 402 to Storage 410. The other allocation rules in data model 400 allocate 100% of the resource to the next data object: allocation rule 412 directs 100% of the resources (e.g., $4,000) to flow to Support 414; allocation rule 418 directs 100% of the resources in Support (e.g., $4,000) to flow to Business Units 420; and allocation rule 416 directs 100% of the resources from Storage 410 to flow to Business Units 420.

In at least one of the various embodiments, resources that flows into a data object may be allocated among the included resource cost line items. In at least one of the various embodiments, each object may have one or more rules that may describe the assignment ratios for how the resources associate with a data object may be assigned to resource cost line items. For the categories 404, 410, 414, and 420, simple allocation rules assign the resources in the object evenly among the resource cost line items comprising each data object. GL 402 may have different assignment ratios, in this non-limiting example, the assignment ratio between the resource cost line items may be 50% to Payroll, 25% to Taxes, and 25% to Rent.

In at least one of the various embodiments, an assignment ratio may represent how the resources in an organization may be assigned to the actual resource cost line items. In at least one of the various embodiments, rules may be applied that distribute the resources based on formulas that may be defined by the users or administrators who designed the data model. In at least one of the various embodiments, the assignment ratios and allocations may be modified as part of the modeling process.

The data model 400 is a simplified model useful for facilitating discussion and understanding of the embodiments, since allocation rules for models of large organizations can be numerous and complex. However, model 400 is at least sufficient to enable one of ordinary skill in the art to practice what is claimed herein.

Figure 5:
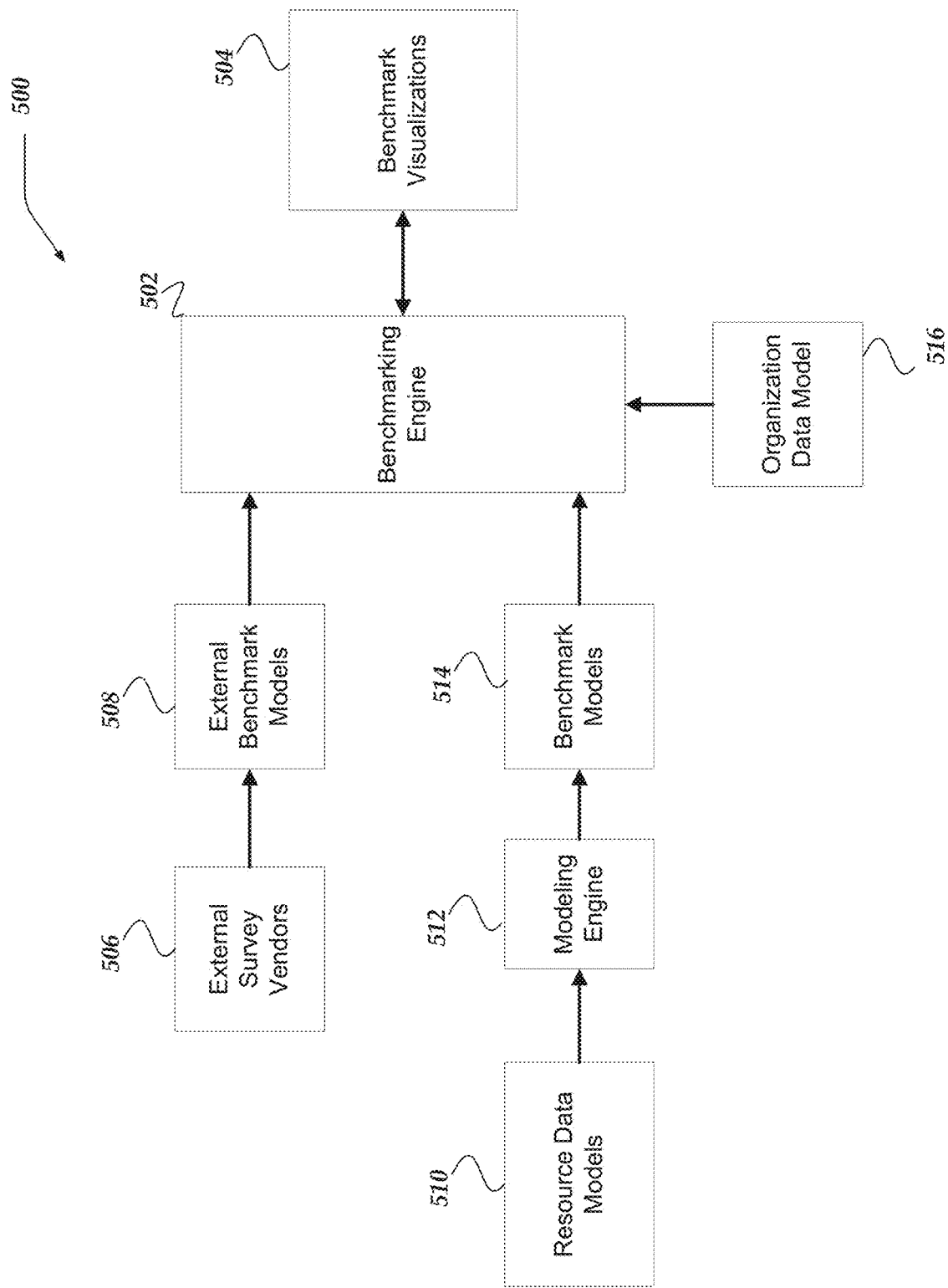
FIG. 5 illustrates a logical architecture of a system for providing models for visualizing resource allocation in accordance with at least one of the various embodiments.

FIG. 5 illustrates a logical architecture of system 500 for providing models for visualizing resource allocation in accordance with at least one of the various embodiments. In at least one of the various embodiments, benchmarking engine 502 may be arranged to managed one or more benchmark models associated with resource allocations and/or resource distribution for a universe of organizations.

In at least one of the various embodiments, benchmark visualization engine 504 may be arranged to provide interactive reports that enable visualization of benchmark information in different dimensions.

In at least one of the various embodiments, external information sources, such as, external survey vendors 508 may provide one or more external benchmark models 508 based on the information they may collect by surveying various organizations. However, since the underlying raw information may be proprietary or otherwise confidential, the vendor may provide external benchmark models 508 rather than the raw information used to generate the benchmark models.

In at least one of the various embodiments, one or more resource data model, such as, data models 510 may be provided to a benchmarking modeling engine, such as, benchmark modeling engine 512. Accordingly, in at least one of the various embodiments, benchmark modeling engine 512 may be arranged to transform the data models into one or more benchmark models 514.

In at least one of the various embodiments, benchmarking engine 502 may be arranged to store benchmark models 508 and benchmark model 514 and provide to the visualization engine based on user interactions and/or one or more characteristics of the organization that may be under analysis.

In at least one of the various embodiments, the organizations under analysis may provide data model information 516 to benchmark engine 502. Accordingly, in at least one of the various embodiments, benchmarking engine 502 may be arranged to apply external benchmark model 508 and benchmark models 514 to produce one or more benchmark visualizations 504 that enable a user to analyze an organization. E.g., the organization represented by data model 516.

Figure 6:
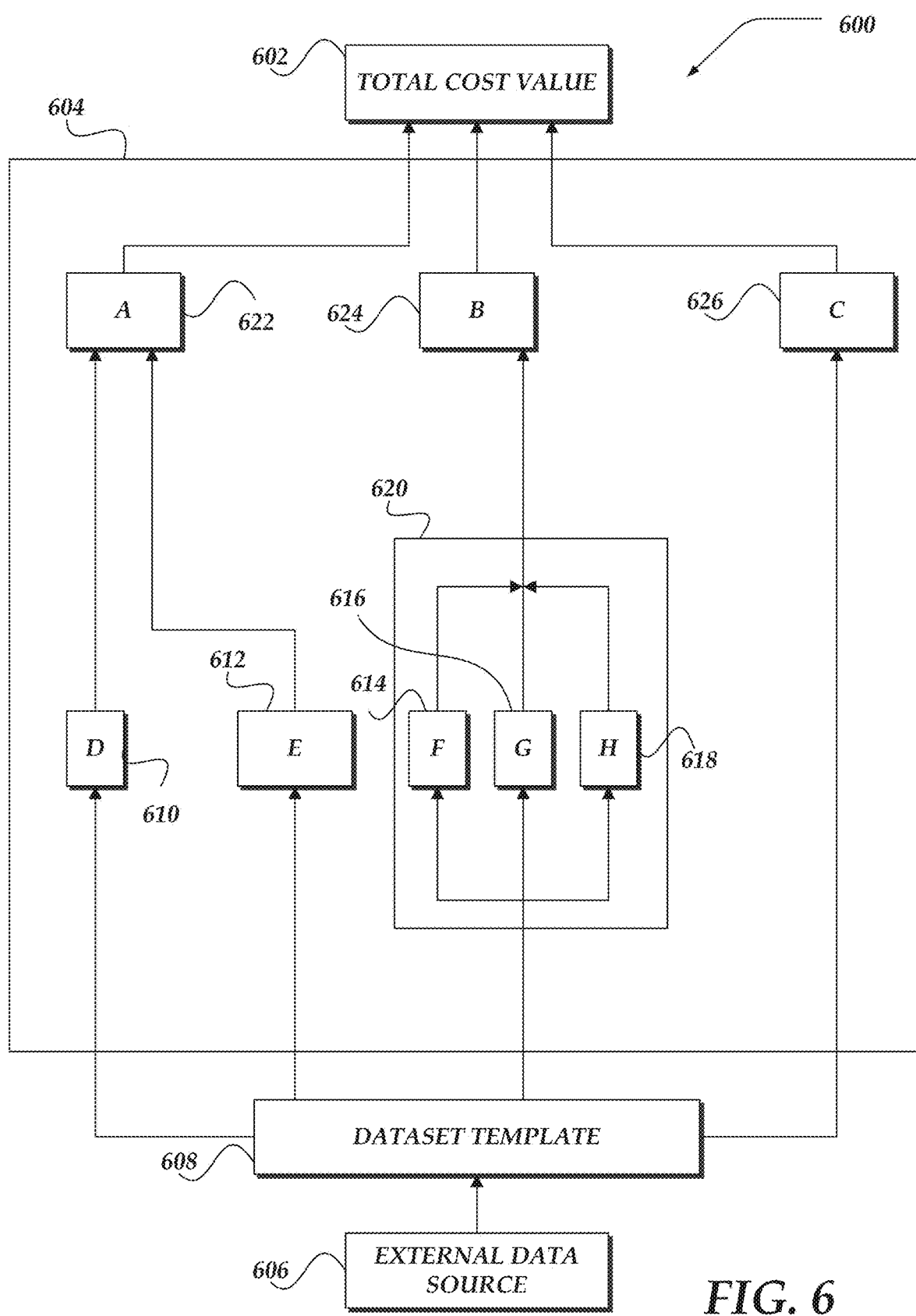
FIG. 6 illustrates an overview of a data model for providing total resource allocation value 602 for a system, such as a business organization.

FIG. 6 illustrates an overview of data model 600 for providing total resource allocation value 602 for a system, such as a business organization. Data source 606 provides a dataset to fields of dataset template 608. At least some of the fields of dataset template 608 normalize the provided dataset. Model template 604 is arranged to map the normalized data in the fields of dataset template 608 to a plurality of data object, including data objects 610, 612, 614, 616, 618, 611, 624, and 626. Also, although not shown, each object may be associated with one or more allocation rules so that allocated percentages of the normalized data set are distributed to the plurality of data objects based on their associated allocation rules.

Additionally, some of the objects may be aggregated into other data objects. For example, objects 610 and 612 may be aggregated into summing object 622. Also, as shown, objects 614 and 616 and 618 may be aggregated together at block 620 and then further allocated to summing object 624. Further, as shown, some portion of the normalized dataset may be allocated directly to summing object 626. The summing objects may then be allocated by allocation rules to provide total resource allocation value 602.

Furthermore, although not shown, in at least one of the various embodiments, data model 600 may be edited to include additional analysis, such as recommendations, simulations, and benchmarks. For example, historical information from other models and heuristics used by other anonymous systems providing the same offering may be employed at least in part to analyze and compare the current model and suggest changes to that model that may be less costly in providing a total cost value for an offering from the current system.

Figure 7:
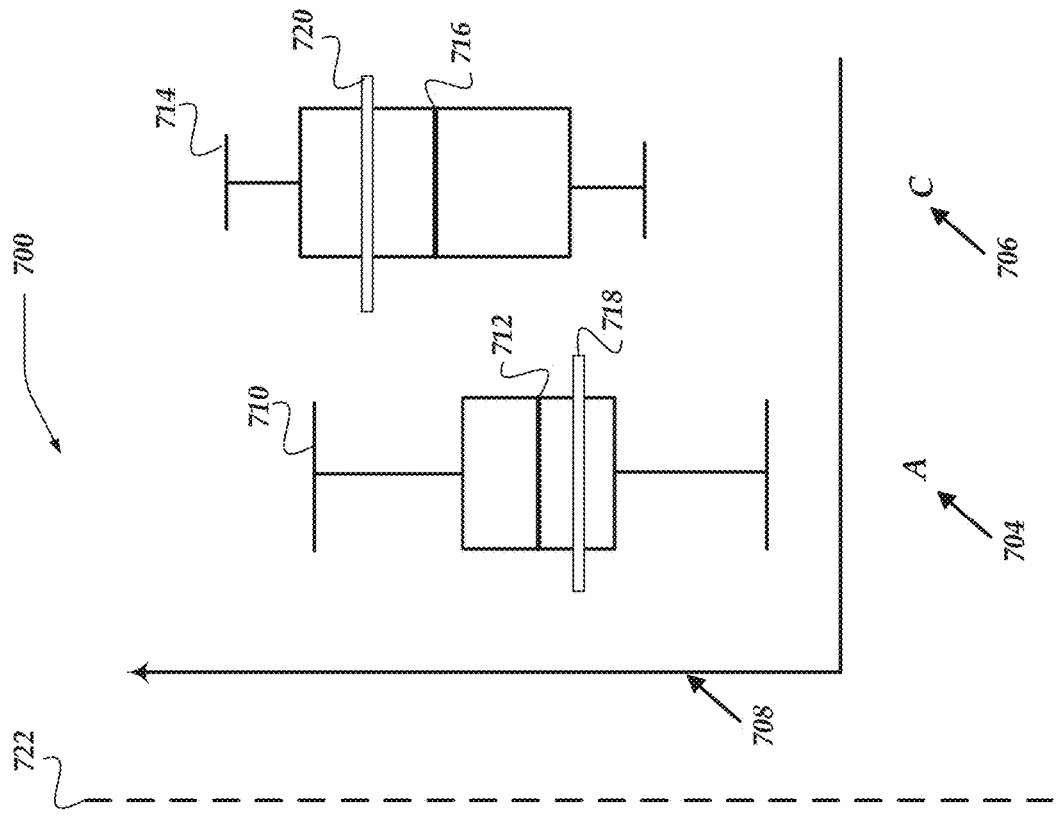
FIG. 7 illustrates a logical transformation a data model into one or more benchmark models in accordance with at least one of the various embodiments.
Figure 7:
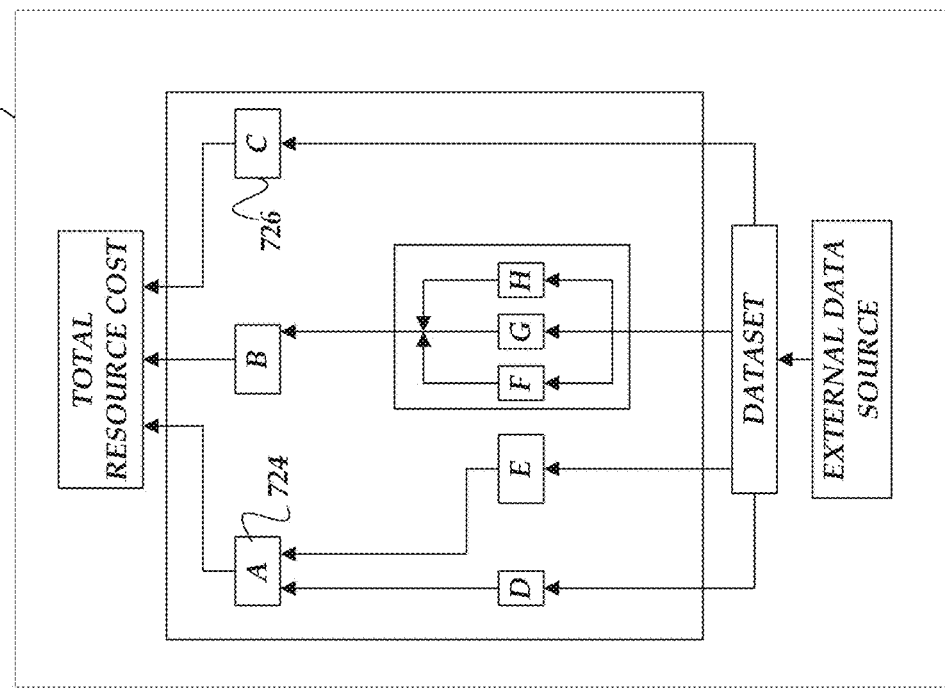

FIG. 7 illustrates a logical transformation a data model into one or more benchmark models in accordance with at least one of the various embodiments. In at least one of the various embodiments, data models, such as, data model 702 may be processed by a benchmark modeling engine and/or benchmarking engine (here logically representing by line 722) into benchmark models.

In at least one of the various embodiments, benchmark modeling engines may be arranged to take one or more data models and provide a plurality of benchmark models based on the data models and their underlying data. In this example, resource allocations associated with data object 724 and data object 726 are modeled using benchmark model 704 and benchmark model 706. In at least one of the various embodiments, benchmark models may include various other values/markers produced from the underlying data models. In this example, box plots are displayed to represent the benchmark models. In other embodiments, other representation may be used depending on the model point that the benchmarking engine may be configured or arranged to provide.

In at least one of the various embodiments, benchmarking engine may be arranged to provide benchmark models that a universe of resource allocation information grouped and/or sliced into various dimensions. In this example, axis 708 may represent the measure of resources allocated for a particular data object class and/or category. Accordingly, in some embodiments, model point 710 may represent a high water mark for allocations associated with data object 724. Likewise, in at least one of the various embodiments, model point 714 may represent the high water mark of resource allocations associated with data object 726. In at least one of the various embodiments, model point 712 and model point 716 may represent median scores for resource allocations associated with data object 724 and data object 726 respectively.

Also, in at least one of the various embodiments, a benchmarking engine may provide the actual resource allocation value for one or more organizations that may be under analysis. In this example, model point 718 may represent the actual resource allocation associated with data object 724 for an organization that is being analyzed. Likewise, in this example, model point 720 may represent the actual resource allocation associated with data object 726 for the organization being analyzed.

In at least one of the various embodiments, the benchmark engine may provide benchmark models that may be arranged based on one or more selected dimensions. In some embodiments, the models may be generated and/or selected based on one or more characteristics of other organizations that may be incorporated into the benchmark models used for analyzing the organization. For example, the benchmark models may be filtered based on revenue, industry, geographic region, or the like, or combination thereof. Accordingly, in at least one of the various embodiments, a user may choose to analyze an organization by comparing its resource allocations to benchmark models that correspond to organizations having a selected revenue range, geographic location, or of a particular industry.

Further, in at least one of the various embodiments, benchmark models may be generated for various organization archetypes, such as, people driven organizations, technology driven organizations, service oriented organizations, or the like, or combination thereof.

Figure 8:
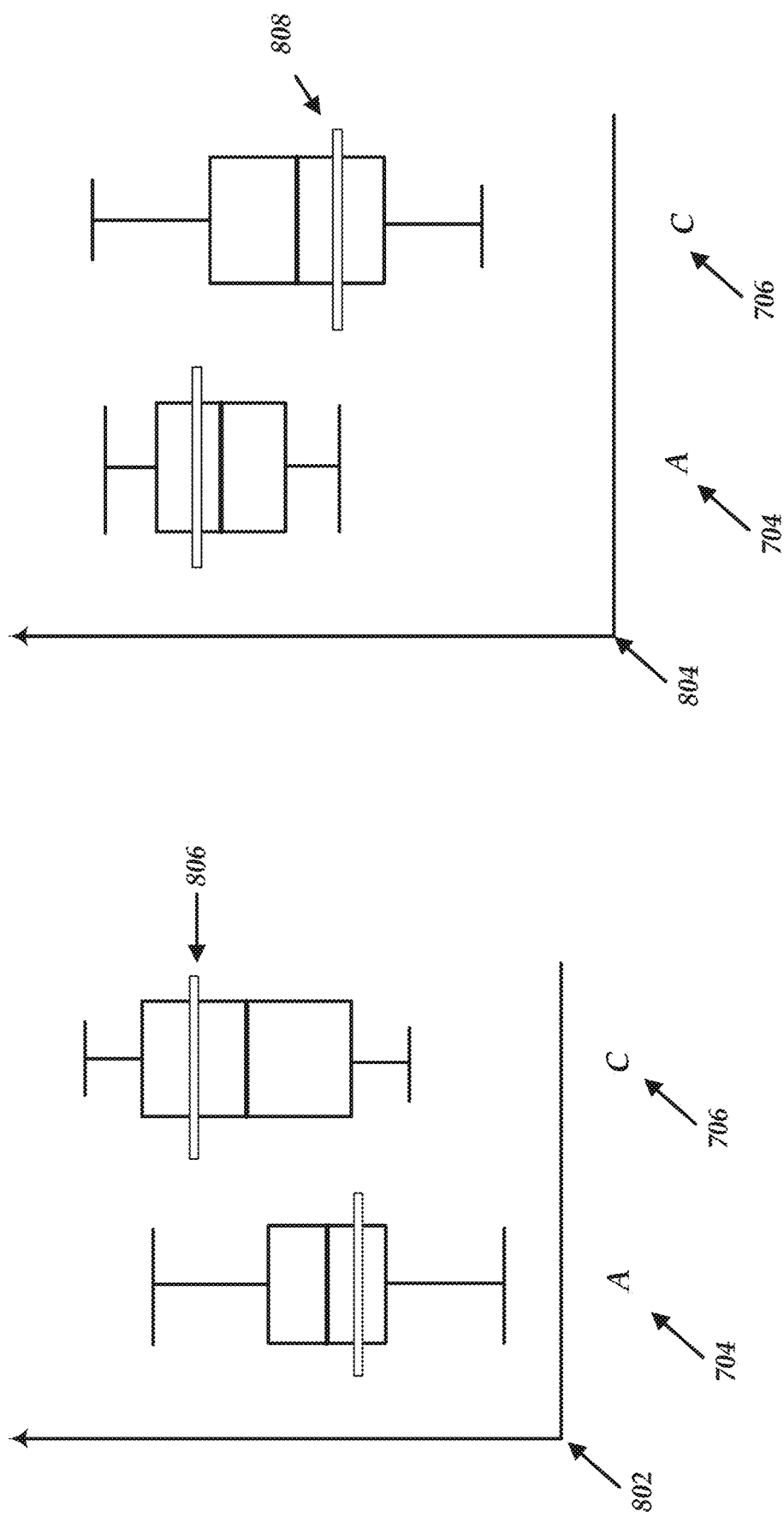
FIG. 8 illustrates a logical representation of benchmark models in accordance with at least one of the embodiments.

FIG. 8 illustrates a logical representation of benchmark models in accordance with at least one of the embodiments. In this example, benchmark models are provided based on different clusters or categories of organizations. Here, in this example, the same data objects as shown in FIG. 7 may be assumed. Accordingly, benchmark model 704 corresponds to data object 724 and benchmark model 706 corresponds to data object 726.

In at least one of the various embodiments, the models may be provided to represent different types of allocations and/or allocation measurements. Accordingly, in this view, axis 802 and axis 804 may represent different representations of resource values.

In at least one of the various embodiments, the organizations actual resource allocation for a data object may compare differently to different benchmark models. In this example, if benchmarking criteria 802 is used, model point 806 is shown to be above the median value, indicating the resource allocations associated data object 726 may be higher than expected given the current benchmark view. Likewise, if benchmark view 804 is examined, the same data object for the same data organization may be discovered to be below the median value.

Accordingly, in at least one of the various embodiments, a benchmarking engine may be arranged to provide benchmark models representing difference characteristics of the universe of data models used to the produce the benchmark models. In some embodiments, external benchmark models provided by external vendors may be defined to be associated with one or more characteristics of their underlying data. In contract, in some embodiments, the benchmarking modeling engine and/or benchmarking engine may be arranged to access additional characteristics used by the data models (e.g., resource data models 510) since the underlying raw data may be available.

Generalized Operations

Figure 9:
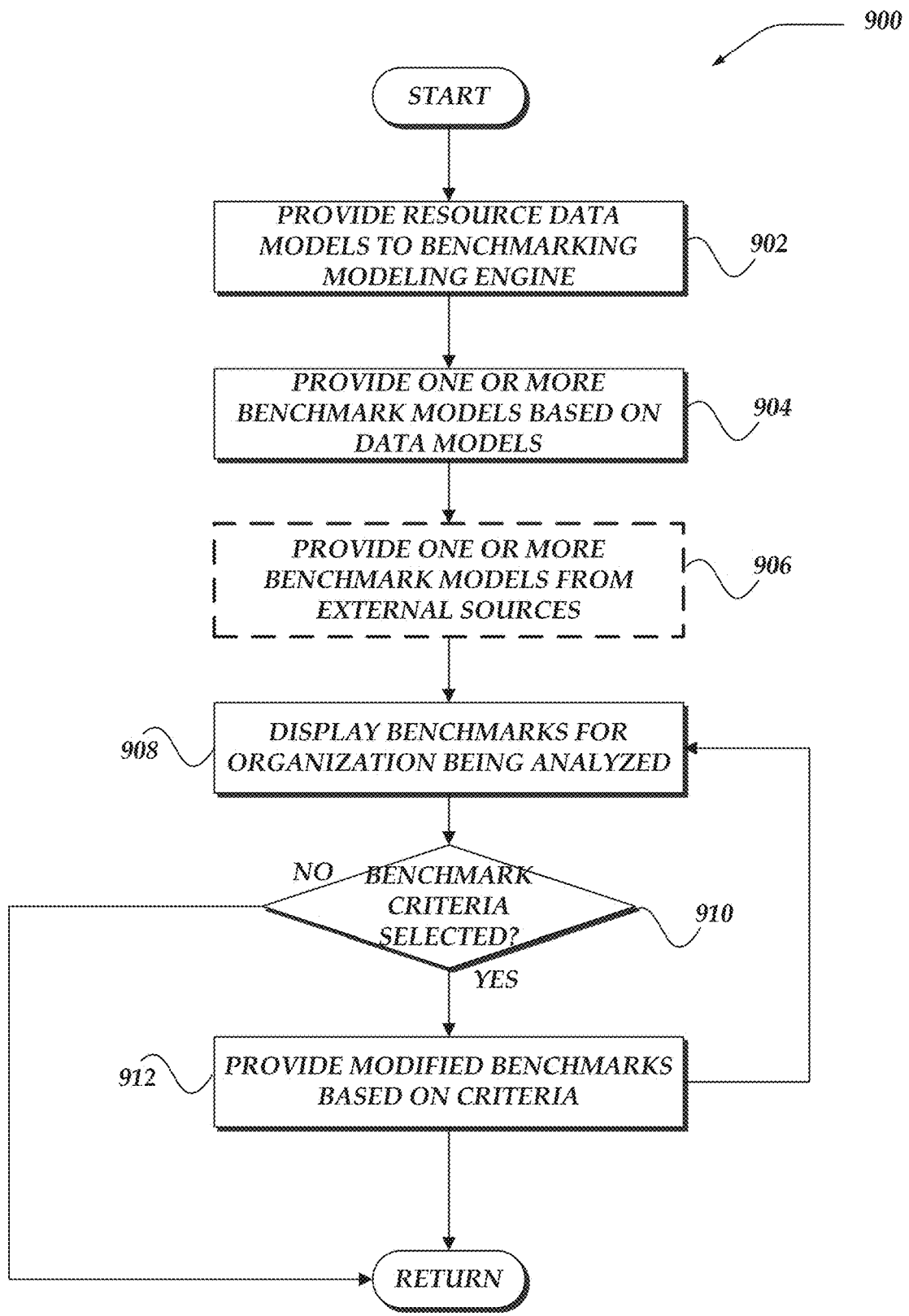
FIG. 9 illustrates an overview flowchart for a process for providing models for visualizing resource allocation in accordance with at least one of the various embodiments.
Figure 10:
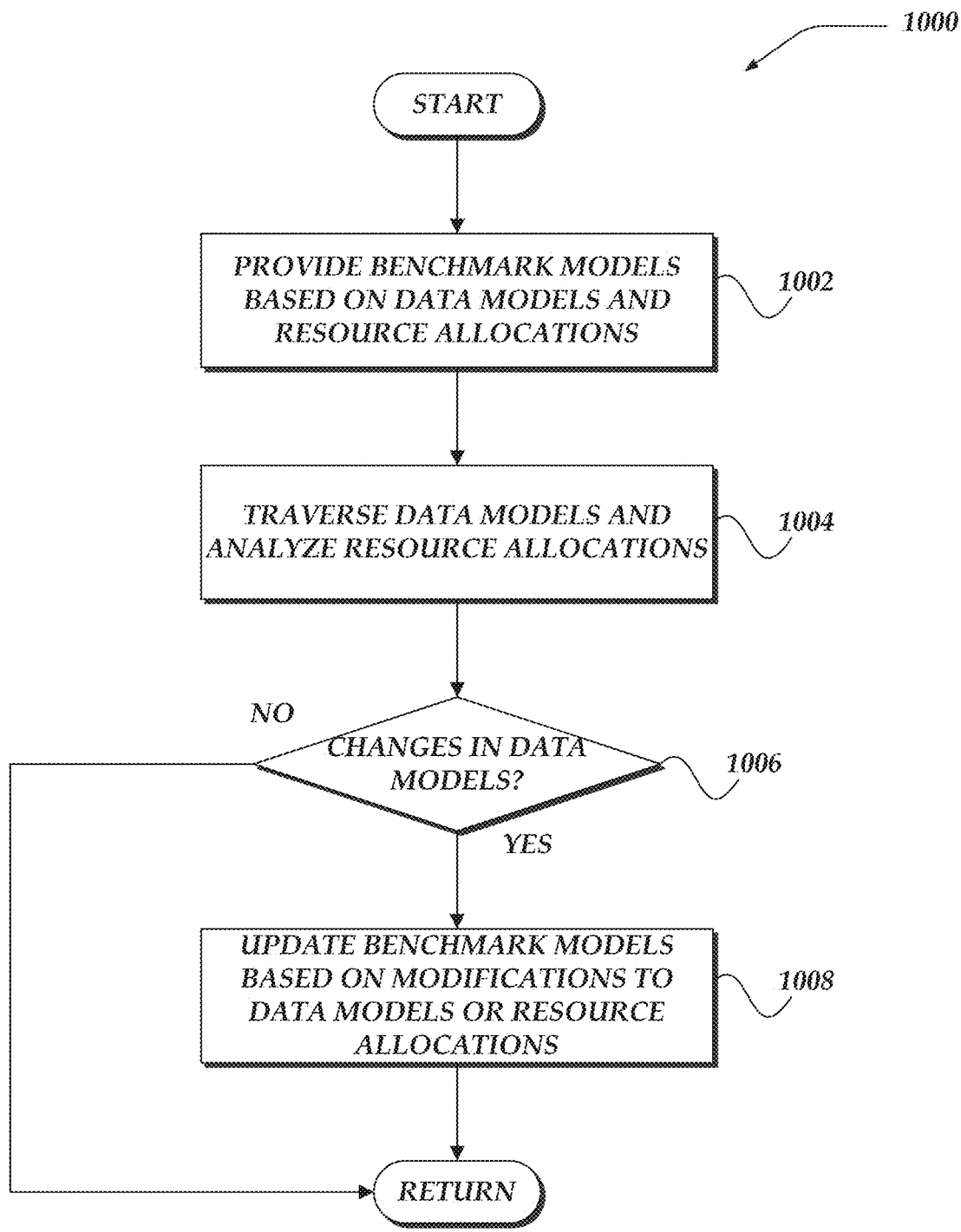
FIG. 10 illustrates an overview flowchart for a process for providing models for visualizing resource allocation in accordance with at least one of the various embodiments.
Figure 11:
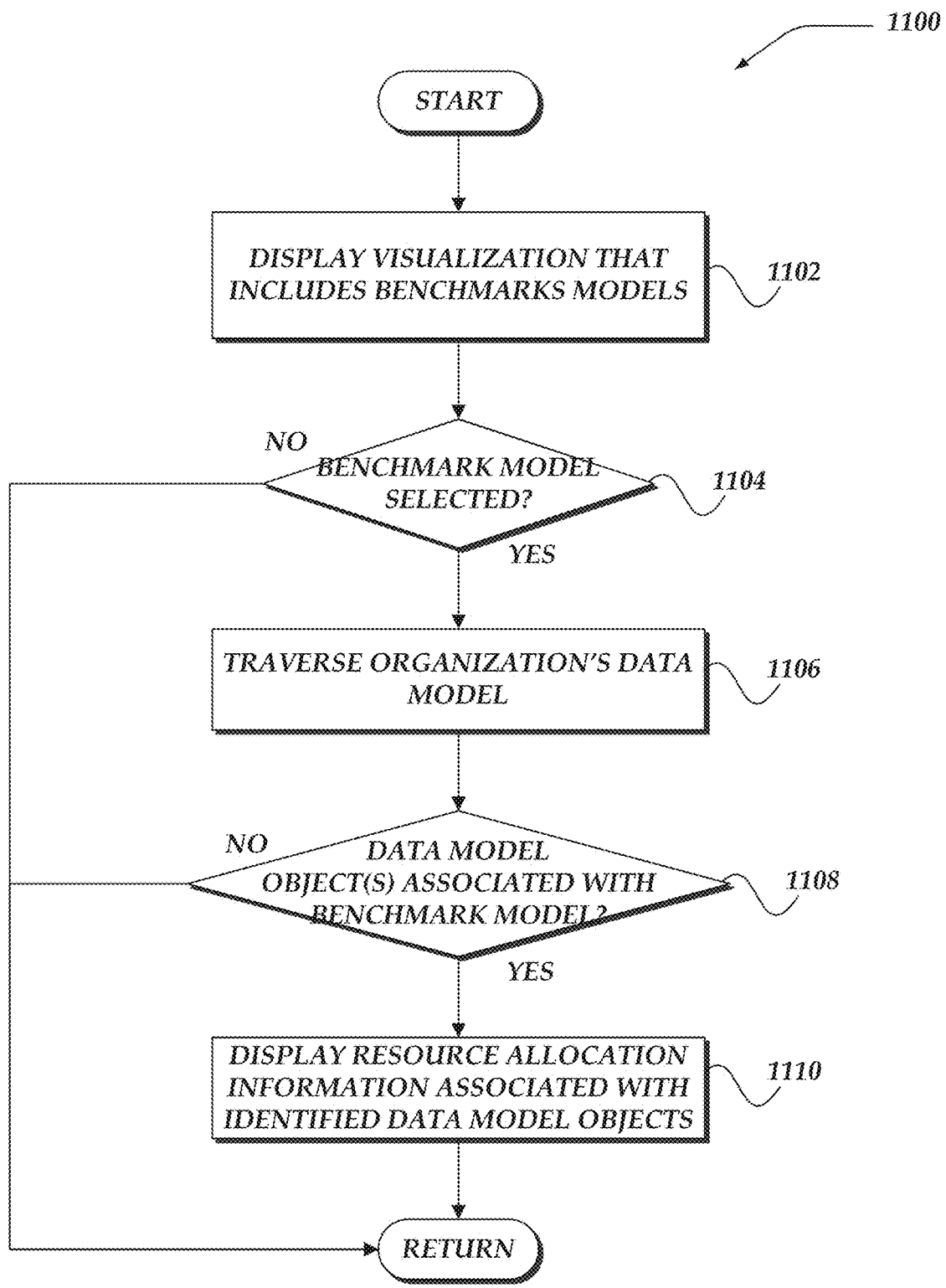
FIG. 11 illustrates an overview flowchart for a process for providing models for visualizing resource allocation in accordance with at least one of the various embodiments.

FIGS. 9-11 represent the generalized operations for models for visualizing resource allocation in accordance with at least one of the various embodiments. In at least one of the various embodiments, processes 900, 1000 and 1100 described in conjunction with FIGS. 9-11 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 9-11 may be operative in resource modeling and providing models for visualizing resource allocation such as described in conjunction with FIGS. 4-8.

FIG. 9 illustrates an overview flowchart for process 900 for providing models for visualizing resource allocation in accordance with at least one of the various embodiments. After a start block, at block 902, in at least one of the various embodiments, one or more resource data models may be provided to a benchmarking modeling engine. In at least one of the various embodiments, the benchmarking engine may be provided data models associated with one or more organizations that may be modeled by a modeling platform. In some embodiments, a modeling platform may include many data models (e.g., 1,000+) associated with different organizations.

In at least one of the various embodiments, these data models may be generated based on datasets and/or allocation rules that may be provided for each of the modeled organizations. In at least one of the various embodiments, the modeling platform may be arranged to access the data sets or the data models since the datasets were provided to create the data models.

At block 904, in at least one of the various embodiments, one or more benchmark models may be provided based on the provided data models. In at least one of the various embodiments, the benchmarking engine may be provide benchmark models that are associated with various data model objects that may be represented by the data models. For example, FIG. 6 illustrates a data model that includes data model objects A-H.

In some embodiments, a portion of the data models generated and stored by a modeling platform may be based on defined templates and/or ontologies that result in data models for different organizations having the same or similar data model objects. However, in some embodiments, different organizations may have different allocation rules and/or resource quantities that reflect some of the individual characteristics of the different organizations. For example, while many organizations may include server objects in their data models, the resource allocations associated with server objects for different organization may be different.

Accordingly, in at least one of the various embodiments, benchmark models may be created for one or more of the shared data model characteristics. For example, a benchmark model may be generated for Server based on an analysis of the different server objects included in the data models of the organizations modeled by the modeling platform. Likewise, additional benchmark models may be generated for other objects and/or characteristics of the modeled organizations.

At block 906, in at least one of the various embodiments, optionally, one or more benchmark models may be provided by external sources. In at least one of the various embodiments, external sources may be provide benchmark models directly. This may enable the external sources to maintain confidentiality of their underlying datasets and/or data models. Also, in at least one of the various embodiments, if the modeling platform does not have enough of its own data for produce particular benchmark models, those benchmark model may be provided by the external sources and used by the benchmarking engine and the visualization engine.

In some embodiments, this step may be optional since in some cases it the benchmark models provided using internal data and/or resource data models may be sufficient. Likewise, in some embodiments, external sources may provide raw datasets that may be used for generating benchmark models rather than providing the benchmark models themselves.

At block 908, in at least one of the various embodiments, display one or more benchmark models for the one or more organizations being analyzed. In at least one of the various embodiments, a visualization engine may be arranged or configured to provide a visualization that compares one or more resource allocations associated with one or more data model objects with the one or more benchmark models. The visualization may be displayed on a hardware display for viewing by a user.

At decision block 910, in at least one of the various embodiments, if benchmark criteria may be selected, control may flow to block 912; otherwise, control may be returned to a calling process. In at least one of the various embodiments, various criteria may be selected for determining which of the benchmark models may be used in the visualization. In some embodiments, the benchmark models may be selected based on one or more criteria of their underlying organization, such as, revenue, geographic region, industry, size of operations, number of employees, or the like. For example, an organization's resource allocations may be compared to benchmark models generated by other organizations in the same industry. Likewise, other or additional criteria may be selected for determining which benchmark models are used in the visualization. In some embodiments, the benchmarking engine may be arranged to recommend one or more criteria based on the organizations data model and/or resource allocations.

At block 912, in at least one of the various embodiments, provide a modified selection of benchmark models based on the selected criteria. In some embodiments, the selected criteria may exclude or include one or more benchmark models. For example, if the selected criteria is healthcare industry, the benchmark models used in the visualization may be generated used organizations (and their data models) that are designated as being in the healthcare industry. Next, control may loop back to block 908.

FIG. 10 illustrates an overview flowchart for process 1000 for providing models for visualizing resource allocation in accordance with at least one of the various embodiments. After a start block, at block 1002, in at least one of the various embodiments, a plurality of benchmark models may be provided by the benchmarking engine as described above. At block 1004, in at least one of the various embodiments, the modeling engine and/or the benchmarking engine may be arranged to periodically traverse the data models that may be managed by the modeling platform. In at least one of the various embodiments, during the traversal, various modifications to the data models and/or allocations may be observed and/or provided. In some embodiments, the modeling platform may be provided one or more updated data sets that may result in the data models and/or allocations for one or more organizations to be modified or updated.

At decision block 1006, in at least one of the various embodiments, if the traversal discovered changes that exceed one or more defined thresholds, control may flow to block 1008; otherwise, control may be returned to a calling process. In at least one of the various embodiments, defined thresholds may include, number of changes to data objects, resource allocation change thresholds, or the like.

At block 1008, in at least one of the various embodiments, the benchmark models may be updated based on the modifications/updates to the data models and/or allocations that may have been discovered during the analysis of the data models. Next, control may be returned to a calling process.

FIG. 11 illustrates an overview flowchart for process 1100 for providing models for visualizing resource allocation in accordance with at least one of the various embodiments. After a start block, at block 1102, in at least one of the various embodiments, as described above one or more benchmark models for comparing an organization may be displayed in an interactive visualization.

At decision block 1104, in at least one of the various embodiments, if a benchmark model displayed in the visualization is selected, control may flow to block 1106; otherwise, control may be returned to a calling process. In at least one of the various embodiments, a user may be enabled to select a benchmark model from the visualization using one or more input methods.

At block 1106, in at least one of the various embodiments, in response to the selection of the data model, the modeling engine and/or the benchmarking engine may be arranged to traverse the data model of the organization under analysis.

At decision block 1108, in at least one of the various embodiments, if the traversing engine encounters one or more data model objects that may be associated with the selected benchmark model, control may flow to block 1110; otherwise, control may be returned to a calling process.

At block 1110, in at least one of the various embodiments, resource allocation information associated with the identified data model objects may be displayed as part of the same visualization or in a different visualization. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Cases

Figure 12:
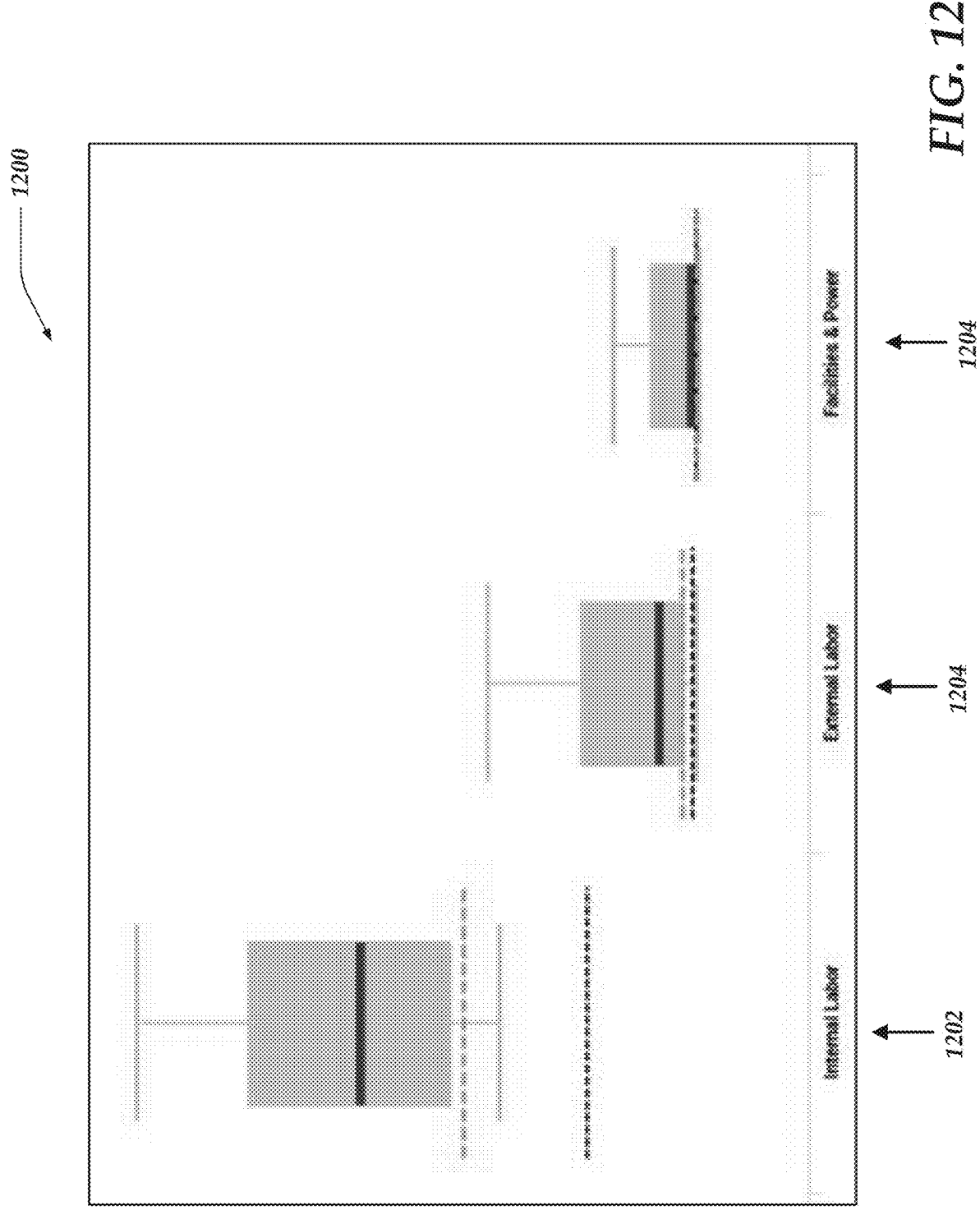
FIG. 12 illustrates a visualization which is a portion of a resource allocation information visualization that is in accordance with at least one of the various embodiments.

FIG. 12 illustrates visualization 1200 which is a portion of a resource allocation information visualization that is in accordance with at least one of the various embodiments. In this example, for at least one of the various embodiments, visualization 1200 shows three benchmark models each associated different data model objects. In this example, benchmark model 1202 represents a benchmark model that is associated with internal labor data model objects. Benchmark model 1204 represents a benchmark model that is associated with external labor data model objects. And, benchmark model 1206 represents a benchmark model that is associated with facilities and power data model objects. Note, as described above, in some embodiments, some data model objects may be summing objects and/or aggregate objects that represent more than one data model data object. For example, in some embodiments, facilities and power data objects may be arranged to include sub-objects for allocating resources for electricity, heating, cooling, repairs, or the like.

What is claimed as new and desired to be protected by Letters Patent of the United States is:

1. A method for visualizing resource allocations using a network computer that employs one or more processors to execute instructions, comprising:
providing a plurality of data models to a benchmarking engine, wherein the plurality of data models are each comprised of two or more nodes and one or more edges from a memory that is configured and arranged to store the plurality of data models, and wherein each node represents a model object and each edge represents a resource allocation;
employing the benchmarking engine and a third party to provide a plurality of benchmark models based on the plurality of data models, wherein a benchmarking model of the third party provides for confidentiality of underlying datasets and the data models that were employed to generate the third party benchmarking model, and wherein the provided plurality of benchmark models are further based on user interactions, characteristics of an organization, selected criteria of the organization, or criteria of the organization that is recommended by the benchmarking engine, and wherein the plurality of benchmark models from the benchmarking engine or the third party are generated for various organization archetypes;
instantiating a visualization engine to provide a visualization presentation that compares the resource allocations between model objects and the benchmark models or the third party benchmarking model, wherein the visualization presentation of benchmarking information corresponding to the benchmark models is displayed in different dimensions on a hardware display for viewing by one or more users, and wherein a node of the benchmarking information is represented as one of the model objects and an edge is represented as the resource allocation;
employing geolocation information based on electronic signals from satellites that are processed by a Global Positioning System (GPS) device by visually modifying elements of the visual presentation in the hardware display used by a database, a user interface, an internal process or a report based on a physical location of a client computer employed by the one or more users, wherein the visual elements modifications include, currency, calendar format, and language; and
employing the criteria of the benchmark models that are selected to perform further actions, including:
employing the benchmarking engine to provide one or more other benchmark models from the plurality of benchmark models based on the selected criteria and the data models and the model objects of the data models, and wherein the data model objects are based upon a summing object and an aggregate object that represent a plurality of other data model objects or sub-objects; and
employing the visualization engine to provide a modified visualization presentation based on the one or more other benchmark models and one or more of the provided characteristics of the organization, and wherein the modified visualization presentation is displayed on the hardware display.

2. The method of claim 1, further comprising, employing a resource modeling engine that traverses the one of the data models corresponding to the organization to provide resource allocation information associated with the model objects.

3. The method of claim 1, further comprising:
providing one or more external benchmark models that are associated with the organization; and
employing the visualization engine to provide another modified visualization based on the one or more external benchmark models, wherein the other modified visualization is displayed on the hardware display.

4. The method of claim 1, wherein providing the plurality of benchmark models, further comprises, providing one or more of the characteristics of the model objects that are associated with the plurality of data models, wherein the one or more characteristics include, a median resource allocation value, an upper quartile resource allocation value, a lower quartile resource allocation value, a highest resource allocation value, or a lowest resource allocation value.

5. The method of claim 1, further comprising:
modifying the plurality of data models based on changes to their resource allocations; and
employing the benchmarking engine to modify the plurality of benchmark models based on the plurality of modified data models.

6. The method of claim 1, wherein providing the plurality of benchmark models, further comprises, providing the plurality of benchmark models based on the criteria associated with the organization, wherein the criteria associated with the organization include revenue, geographic region, size of operations, volume of production, number of employees, or industry.

7. The method of claim 1, further comprising, when one of the benchmark models is selected, performing further actions, comprising:
traversing the data model corresponding to the organization to identify the one of the model objects associated with the selected benchmark models; and
displaying resource allocation information for the identified one of the model objects on the hardware display.

8. A system for visualizing resource allocations, comprising: a network computer, comprising:
a transceiver that communicates over the network;
a memory that stores at least instructions; and
one or more processor devices that execute instructions that perform actions, including:

providing a plurality of data models to a benchmarking engine, wherein the plurality of data models are each comprised of two or more nodes and one or more edges from the memory that is configured and arranged to store the plurality of data models, and wherein each node represents a model object and each edge represents a resource allocation;

employing the benchmarking engine and a third party to provide a plurality of benchmark models based on the plurality of data models, wherein a benchmarking model of the third party provides for confidentiality of underlying datasets and the data models that were employed to generate the third party benchmarking model, and wherein the provided plurality of benchmark models are further based on user interactions, characteristics of an organization, selected criteria of the organization, or criteria of the organization that is recommended by the benchmarking engine, and wherein the plurality of benchmark models from the benchmarking engine or the third party are generated for various organization archetypes;

instantiating a visualization engine to provide a visualization presentation that compares the resource allocations between model objects and the benchmark models or the third party benchmarking model, wherein the visualization presentation of benchmarking information corresponding to the benchmark models is displayed in different dimensions on a hardware display for viewing by one or more users, and wherein a node of the benchmarking information is represented as one of the model objects and an edge is represented as the resource allocation;

employing geolocation information based on electronic signals from satellites that are processed by a Global Positioning System (GPS) device by visually modifying elements of the visual presentation in the hardware display used by a database, a user interface, an internal process or a report based on a physical location of a client computer employed by the one or more users, wherein the visual elements modifications include, currency, calendar format, and language; and employing the criteria of the benchmark models that are selected to perform further actions, including:
  employing the benchmarking engine to provide one or more other benchmark models from the plurality of benchmark models based on the selected criteria and the data models and the model objects of the data models, and wherein the data model objects are based upon a summing object and an aggregate object that represent a plurality of other data model objects or sub-objects; and
  employing the visualization engine to provide a modified visualization presentation based on the one or more other benchmark models and one or more of the provided characteristics of the organization, and wherein the modified visualization presentation is displayed on the hardware display; and the client computer, comprising:
  a client computer transceiver that communicates over the network;
  a client computer memory that stores at least instructions; and
  one or more other processor devices that execute instructions that perform actions, including:
    providing the selected benchmark criteria; and
    displaying the visualization presentation or the modified visualization presentation.

9. The system of claim 8, wherein the one or more network computer processor devices execute instructions that perform actions, further comprising, employing a resource modeling engine that traverses one of the data models corresponding to the organization to provide resource allocation information associated with the model objects.

10. The system of claim 8, wherein the one or more network computer processor devices execute instructions that perform actions, further comprising:
  providing one or more external benchmark models that are associated with the organization; and
  employing the visualization engine to provide another modified visualization based on the one or more external benchmark models, wherein the other modified visualization is displayed on the hardware display.

11. The system of claim 8, wherein providing the plurality of benchmark models, further comprises, providing one or more of the characteristics of the model objects that are associated with the plurality of data models, wherein the one or more characteristics include, a median resource allocation value, an upper quartile resource allocation value, a lower quartile resource allocation value, a highest resource allocation value, or a lowest resource allocation value.

12. The system of claim 8, wherein the one or more network computer processor devices execute instructions that perform actions, further comprising:
  modifying the plurality of data models based on changes to their resource allocations; and
  employing the benchmarking engine to modify the plurality of benchmark models based on the plurality of modified data models.

13. The system of claim 8, wherein providing the plurality of benchmark models, further comprises, providing the plurality of benchmark models based on the criteria associated with the organization, wherein the criteria associated with the organization include revenue, geographic region, size of operations, volume of production, number of employees, or industry.

14. The system of claim 8, wherein the one or more network computer processor devices execute instructions that perform actions, further comprising, when one of the benchmark models is selected, performing further actions, comprising:
  traversing the data model corresponding to the organization to identify the one of the model objects associated with the selected benchmark models; and
  displaying resource allocation information for the identified one of the model objects on the hardware display.

15. A processor readable non-transitory storage media that includes instructions for visualizing resource allocations, wherein execution of the instructions by one or more hardware processors performs actions, comprising:
  providing a plurality of data models to a benchmarking engine, wherein the plurality of data models are each comprised of two or more nodes and one or more edges from a memory that is configured and arranged to store the plurality of data models, and wherein each node represents a model object and each edge represents a resource allocation;
  employing the benchmarking engine and a third party to provide a plurality of benchmark models based on the plurality of data models, wherein a benchmarking model of the third party provides for confidentiality of underlying datasets and the data models that were employed to generate the third party benchmarking model, and wherein the provided plurality of benchmark models are further based user interactions, characteristics of an organization, selected criteria of the organization, or criteria of the organization that is recommended by the benchmarking engine, and wherein the plurality of benchmark models from the benchmarking engine or the third party are generated for various organization archetypes;

instantiating a visualization engine to provide a visualization presentation that compares the resource allocations between model objects and the benchmark models or the third party benchmarking model, wherein the visualization presentation of benchmarking information corresponding to the benchmark models is displayed in different dimensions on a hardware display for viewing by one or more users, and wherein a node of the benchmarking information is represented as one of the model objects and an edge is represented as the resource allocation;

employing geolocation information based on electronic signals from satellites that are processed by a Global Positioning System (GPS) device by visually modifying elements of the visual presentation in the hardware display used by a database, a user interface, an internal process or a report based on a physical location of a client computer employed by the one or more users, wherein the visual elements modifications include, currency, calendar format, and language; and employing the criteria of the benchmark models that are selected to perform further actions, including:
employing the benchmarking engine to provide one or more other benchmark models from the plurality of benchmark models based on the selected criteria and the data models and the model objects of the data models, and wherein the data model objects are based upon a summing object and an aggregate object that represent a plurality of other data model objects or sub-objects; and employing the visualization engine to provide a modified visualization presentation based on the one or more other benchmark models and one or more of the provided characteristics of the organization, and wherein the modified visualization presentation is displayed on the hardware display.

16. The media of claim 15, further comprising, employing a resource modeling engine that traverses the one of the data models corresponding to the organization to provide resource allocation information associated with the model objects.

17. The media of claim 15, further comprising:
providing one or more external benchmark models that are associated with the organization; and
employing the visualization engine to provide another modified visualization based on the one or more external benchmark models, wherein the other modified visualization is displayed on the hardware display.

18. The media of claim 15, wherein providing the plurality of benchmark models, further comprises, providing one or more of the characteristics of the model objects that are associated with the plurality of data models, wherein the one or more characteristics include, a median resource allocation value, an upper quartile resource allocation value, a lower quartile resource allocation value, a highest resource allocation value, or a lowest resource allocation value.

19. The media of claim 15, further comprising:
modifying the plurality of data models based on changes to their resource allocations; and
employing the benchmarking engine to modify the plurality of benchmark models based on the plurality of modified data models.

20. The media of claim 15, wherein providing the plurality of benchmark models, further comprises, providing the plurality of benchmark models based on the criteria associated with the organization, wherein the criteria associated with the organization include revenue, geographic region, size of operations, volume of production, number of employees, or industry.

21. The media of claim 15, further comprising, when one of the benchmark models is selected, performing further actions, comprising:
traversing the data model corresponding to the organization to identify the one of the model objects associated with the selected benchmark models; and
displaying resource allocation information for the identified one of the model objects on the hardware display.

22. A network computer for visualizing resource allocations, comprising:
a transceiver that communicates over the network;
a memory that stores at least instructions; and
one or more processor devices that execute instructions that perform actions, including:
providing a plurality of data models to a benchmarking engine, wherein the plurality of data models are each comprised of two or more nodes and one or more edges from the memory that is configured and arranged to store the plurality of data models, and wherein each node represents a model object and each edge represents a resource allocation;

employing the benchmarking engine and a third party to provide a plurality of benchmark models based on the plurality of data models, wherein a benchmarking model of the third party provides for confidentiality of underlying datasets and the data models that were employed to generate the third party benchmarking model, and wherein the provided plurality of benchmark models are further based on user interactions, characteristics of an organization, selected criteria of the organization, or criteria of the organization that is recommended by the benchmarking engine, and wherein the plurality of benchmark models from the benchmarking engine or the third party are generated for various organization archetypes;

instantiating a visualization engine to provide a visualization presentation that compares the resource allocations between model objects and the benchmark models or the third party benchmarking model, wherein the visualization presentation of benchmarking information corresponding to the benchmark models is displayed in different dimensions on a hardware display for viewing by one or more users, and wherein a node of the benchmarking information is represented as one of the model objects and an edge is represented as the resource allocation;

employing geolocation information based on electronic signals from satellites that are processed by a Global Positioning System (GPS) device by visually modifying elements of the visual presentation in the hardware display used by a database, a user interface, an internal process or a report based on a physical location of a client computer employed by the one or more users, wherein the visual elements modifications include, currency, calendar format, and language; and
employing the criteria of the benchmark models that are selected to perform further actions, including:
employing the benchmarking engine to provide one or more other benchmark models from the plurality of benchmark models based on the selected criteria and the data models and the model objects of the data models, and wherein the data model objects are based upon a summing object and an aggregate object that represent a plurality of other data model objects or sub-objects; and
employing the visualization engine to provide a modified visualization presentation based on the one or more other benchmark models and one or more of the provided characteristics of the organization, and wherein the modified visualization presentation is displayed on the hardware display.

23. The network computer of claim 22, further comprising, employing a resource modeling engine that traverses the one of the data models corresponding to the organization to provide resource allocation information associated with the model objects.

24. The network computer of claim 22, further comprising:
providing one or more external benchmark models that are associated with the organization; and
employing the visualization engine to provide another modified visualization based on the one or more external benchmark models, wherein the other modified visualization is displayed on the hardware display.

25. The network computer of claim 22, wherein providing the plurality of benchmark models, further comprises, providing one or more of the characteristics of the model objects that are associated with the plurality of data models, wherein the one or more characteristics include, a median resource allocation value, an upper quartile resource allocation value, a lower quartile resource allocation value, a highest resource allocation value, or a lowest resource allocation value.

26. The network computer of claim 22, further comprising:
modifying the plurality of data models based on changes to their resource allocations; and
employing the benchmarking engine to modify the plurality of benchmark models based on the plurality of modified data models.

27. The network computer of claim 22, wherein providing the plurality of benchmark models, further comprises, providing the plurality of benchmark models based on the criteria associated with the organization, wherein the criteria associated with the organization include revenue, geographic region, size of production, volume of production, number of employees, or industry.

28. The network computer of claim 22, further comprising, when one of the benchmark models is selected, performing further actions, comprising:
traversing the data model corresponding to the organization to identify the one of the model objects associated with the selected benchmark models; and
displaying resource allocation information for the identified one of the model objects on the hardware display.

* * * * *